(12) United States Patent
Gao et al.

(10) Patent No.: US 12,317,107 B2
(45) Date of Patent: May 27, 2025

(54) METHOD AND DEVICE FOR DETERMINING DYNAMIC HARQ-ACK CODEBOOK

(71) Applicant: DATANG MOBILE COMMUNICATIONS EQUIPMENT CO., LTD., Beijing (CN)

(72) Inventors: Xuejuan Gao, Beijing (CN); Yanping Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 635 days.

(21) Appl. No.: 17/611,533

(22) PCT Filed: Apr. 16, 2020

(86) PCT No.: PCT/CN2020/085215
§ 371 (c)(1),
(2) Date: Nov. 15, 2021

(87) PCT Pub. No.: WO2020/228480
PCT Pub. Date: Nov. 19, 2020

(65) Prior Publication Data
US 2022/0264340 A1    Aug. 18, 2022

(30) Foreign Application Priority Data
May 15, 2019    (CN) .......................... 201910403738.5

(51) Int. Cl.
*H04W 24/08*    (2009.01)
*H04L 1/1812*    (2023.01)
(Continued)

(52) U.S. Cl.
CPC ............ *H04W 24/08* (2013.01); *H04L 1/1812* (2013.01); *H04L 5/0053* (2013.01); *H04W 72/0446* (2013.01); *H04W 72/23* (2023.01)

(58) Field of Classification Search
CPC . H04W 24/08; H04W 72/0446; H04W 72/23; H04W 72/1273; H04W 76/27;
(Continued)

(56) References Cited

U.S. PATENT DOCUMENTS

2017/0134140 A1    5/2017  Park
2019/0254110 A1*   8/2019  He ........................ H04W 76/27
(Continued)

FOREIGN PATENT DOCUMENTS

CN    101777972 A    7/2010
CN    107332646 A    11/2017
(Continued)

OTHER PUBLICATIONS

3GPP TS 38.213 V15.2.0, 3rd Generation Partnership Project; Technical Specification Group Radio Access Network; NR; Physical layer procedures for control, Release 15, total 98 pages, Jun. 2018.
(Continued)

Primary Examiner — Kiet Tang
(74) Attorney, Agent, or Firm — Kilpatrick Townsend & Stockton LLP

(57) ABSTRACT

The present application relates to the field of wireless communications, and in particular to a method and device for determining a dynamic HARQ-ACK codebook, and same are used to solve the problem that the wrong dynamic HARQ-ACK codebook is determined due to the inaccuracy of a PDCCH monitoring occasion set determined at present. According to the embodiments of the present application, the method involves: determining a PDCCH monitoring
(Continued)

```
┌─ 400
│ Determining a PDCCH monitoring occasion set
│ based on the configured number of PDSCH
│ repetitions and/or on the PDSCH repetition number
│ N=1; wherein the configured number of PDSCH
│ repetitions is greater than 1
└─

↓

┌─ 401
│ Determining the dynamic HARQ-ACK codebook
│ based on the PDCCH monitoring occasion set
└─
``` occasion set according to the configured number of repeated PDSCH transmissions and/or the number (N=1) of repeated PDSCH transmissions, and the configured number of repeated PDSCH transmissions is greater than one; and determining a dynamic HARQ-ACK codebook according to the PDCCH monitoring occasion set.

15 Claims, 4 Drawing Sheets

(51) Int. Cl.
    *H04L 5/00*       (2006.01)
    *H04W 72/0446*   (2023.01)
    *H04W 72/23*     (2023.01)

(58) Field of Classification Search
    CPC ... H04L 1/1812; H04L 5/0053; H04L 1/0038; H04L 1/08; H04L 1/1854; H04L 5/001; H04L 5/0055; H04L 1/0026; H04L 24/00
    See application file for complete search history.

(56) References Cited

U.S. PATENT DOCUMENTS

2019/0306841 A1* 10/2019 Huang ............... H04L 5/0055
2020/0163156 A1* 5/2020 Ye ..................... H04W 88/06

FOREIGN PATENT DOCUMENTS

| CN | 109391422 A | 2/2019 |
| TW | 201822562 A | 6/2018 |

OTHER PUBLICATIONS

Lenovo et al., "HARQ enhancement for NR-U", 3GPP TSG RAN WG1 #96, Athens, Greece, Feb. 25-Mar. 1, 2019, total 5 pages, R1-1902152.

CATT, "Remaining issues on NR HARQ timing", 3GPP TSG RAN WG1 Meeting #92bis, Sanya, China, Apr. 16-20, 2018, total 7 pages, R1-1803758.

MediaTek Inc., "Evaluations and enhancements of NR control channels for URLLC Document for: Discussion and Decision", 3GPP TSG RAN WG1 Meeting #94bis, Chengdu, China, Oct. 8-12, 2018, total 10 pages, R1-1810463.

* cited by examiner

METHOD AND DEVICE FOR DETERMINING DYNAMIC HARQ-ACK CODEBOOK

CROSS-REFERENCE OF RELATED APPLICATIONS

The present application is a national phase entry under 35 U.S.C. § 371 of International Application No. PCT/CN2020/085215, filed on Apr. 16, 2020, which claims the priority from Chinese Patent Application No. 201910403738.5, filed with the China National Intellectual Property Administration on May 15, 2019 and entitled "Method and Device for Determining Dynamic HARQ-ACK Codebook", which is hereby incorporated by reference in its entirety.

FIELD

The present application relates to the field of wireless communication technologies, and in particular to a method and device for determining a dynamic HARQ-ACK codebook.

BACKGROUND

The flexible timing relationship is supported in the 5th Generation New RAT (5G NR). For the Physical Downlink Shared Channel (PDSCH), the Physical Downlink Control CHannel (PDCCH) carrying scheduling information of PDSCH indicates the scheduling timing relationship (Scheduling timing, i.e., K0) between the PDSCH and the PDCCH, and the feedback timing relationship (HARQ-ACK timing, i.e., K1) between the PDSCH and its corresponding Hybrid Automatic Repeat reQuest (HARQ)-Acknowledgement (ACK). The indication field of time domain resource allocation in the Downlink Control Information (DCI) format used by the PDCCH indicates the slot offset K0 between the slot where the PDSCH is located and the slot where the DCI is located; and the indication field of PDSCH to HARQ-ACK feedback timing in the DCI indicates the number K1 of slots between the end of the PDSCH and the beginning of HARQ-ACK, that is, if the PDSCH is transmitted in slot n, the HARQ-ACK transmission is performed in slot n+K1, as shown in FIG. 1. The full set of K1 is {0, 1, 2, 3, 4, 5, 6, 7, 8, 9, 10, 11, 12, 13, 14, 15}, and it is usually configured with up to 8 values for a terminal. In the Rel-15, the value of K1 is in units of slot, that is, K1=1 means that the spacing is one slot.

In the NR Rel-15, the dynamic HARQ-ACK codebook is supported. When the PDSCH is configured to be repeatedly transmitted, it is currently defined that the dynamic HARQ-ACK codebook is determined based on the number of repetitions configured. However, even if the number of repetitions is configured, the terminal may also perform the non-repetitive transmission (for example, the terminal performs the non-repetitive PDSCH or Semi-Persistant Scheduling (SPS) PDSCH release transmission). If the PDCCH monitoring occasion set of the dynamic HARQ-ACK codebook is always determined based on the number of repetitions, the determined PDCCH monitoring occasion set may be inaccurate when the terminal performs the non-repetitive transmission, so that the wrong dynamic HARQ-ACK codebook is determined, resulting in the wrong HARQ-ACK transmission.

SUMMARY

The present application provides a method and device for determining a dynamic HARQ-ACK codebook, to solve the current problem that wrong dynamic HARQ-ACK codebook is determined due to that the PDCCH monitoring occasion set of the dynamic HARQ-ACK codebook determined based on the number of repetitions is not accurate.

Based on the foregoing problem, some embodiments of the present application provide a method for determining a dynamic HARQ-ACK codebook, including:
   determining a PDCCH monitoring occasion set based on the configured number of PDSCH repetitions and/or on the PDSCH repetition number N=1; and the configured number of PDSCH repetitions is greater than 1;
   determining the dynamic HARQ-ACK codebook based on the PDCCH monitoring occasion set.

In one embodiment, determining the PDCCH monitoring occasion set includes:
   determining the PDCCH monitoring occasion set based on the configured number of PDSCH repetitions and on the PDSCH repetition number N=1, when it is configured to monitor a PDCCH using Downlink Control Information, DCI, format 1-1;
   otherwise, determining the PDCCH monitoring occasion set based on the configured number of PDSCH repetitions.

In one embodiment,
for each carrier, when it is configured to monitor the PDCCH using DCI format 1-1,
   determining a PDCCH monitoring occasion set corresponding to the carrier based on the configured number of PDSCH repetitions and on the PDSCH repetition number N=1;
   otherwise, determining the PDCCH monitoring occasion set corresponding to the carrier based on the configured number of PDSCH repetitions;
or
for a group of carriers in case of carrier aggregation, when it is configured for at least one carrier in the group of carriers to monitor the PDCCH using DCI format 1-1, for each carrier in the group of carriers,
   determining a PDCCH monitoring occasion set corresponding to the each carrier in the group of carriers based on the configured number of PDSCH repetitions and on the PDSCH repetition number N=1;
   otherwise, determining the PDCCH monitoring occasion set corresponding to the carrier based on the configured number of PDSCH repetitions.

In one embodiment, determining the PDCCH monitoring occasion set includes:
   determining the PDCCH monitoring occasion set based on the configured number of PDSCH repetitions and on the PDSCH repetition number N=1 when it is configured to monitor a PDCCH using DCI format 1-0;
   otherwise, determining the PDCCH monitoring occasion set based on the configured number of PDSCH repetitions.

In one embodiment,
for each carrier, when it is configured to monitor the PDCCH using DCI format 1-0,
   determining a PDCCH monitoring occasion set corresponding to the carrier based on the configured number of PDSCH repetitions and on the PDSCH repetition number N=1;
   otherwise, determining the PDCCH monitoring occasion set corresponding to the carrier based on the configured number of PDSCH repetitions;
or
for a group of carriers in case of carrier aggregation, when it is configured for at least one carrier in the group of carriers to monitor the PDCCH using DCI format 1-0, for each carrier in the group of carriers,
    determining a PDCCH monitoring occasion set corresponding to the each carrier in the group of carriers based on the configured number of PDSCH repetitions and on the PDSCH repetition number N=1;
    otherwise, determining the PDCCH monitoring occasion set corresponding to the each carrier in the group of carriers based on the configured number of PDSCH repetitions.

In one embodiment, determining the PDCCH monitoring occasion set includes:
    determining the PDCCH monitoring occasion set based on the configured number of PDSCH repetitions and on the PDSCH repetition number N=1 when it is configured to monitor a PDCCH using DCI format 1-1 and a PDCCH using DCI format 1-0;
    otherwise, determining the PDCCH monitoring occasion set based on the configured number of PDSCH repetitions.

In one embodiment,
for each carrier, when it is configured to monitor the PDCCH using DCI format 1-1 and the PDCCH using DCI format 1-0,
    determining a PDCCH monitoring occasion set corresponding to the carrier based on the configured number of PDSCH repetitions and on the PDSCH repetition number N=1;
    otherwise, determining the PDCCH monitoring occasion set corresponding to the carrier based on the configured number of PDSCH repetitions;
or
for a group of carriers in case of carrier aggregation, when it is configured for at least one carrier in the group of carriers to monitor the PDCCH using DCI format 1-1 and for at least one carrier to monitor the PDCCH using DCI format 1-0, for each carrier in the group of carriers,
    determining a PDCCH monitoring occasion set corresponding to the each carrier in the group of carriers based on the configured number of PDSCH repetitions and on the PDSCH repetition number N=1;
    otherwise, determining the PDCCH monitoring occasion set corresponding to the each carrier in the group of carriers based on the configured number of PDSCH repetitions.

In one embodiment, determining the PDCCH monitoring occasion set includes:
    determining the PDCCH monitoring occasion set based on the PDSCH repetition number N=1 when it is configured to monitor only a PDCCH using DCI format 1-0;
    otherwise, determining the PDCCH monitoring occasion set based on the configured number of PDSCH repetitions and on the PDSCH repetition number N=1.

In one embodiment,
for each carrier, when it is configured to monitor only the PDCCH using DCI format 1-0,
    determining a PDCCH monitoring occasion set corresponding to the carrier based on the PDSCH repetition number N=1;
    otherwise, determining the PDCCH monitoring occasion set corresponding to the carrier based on the configured number of PDSCH repetitions and on the PDSCH repetition number N=1;
or
for a group of carriers in case of carrier aggregation, when it is configured for each carrier in the group of carriers to monitor only the PDCCH using DCI format 1-0, for each carrier in the group of carriers,
    determining a PDCCH monitoring occasion set corresponding to the each carrier in the group of carriers based on the PDSCH repetition number N=1;
    otherwise, determining a PDCCH monitoring occasion set corresponding to the each carrier in the group of carriers based on the configured number of PDSCH repetitions and on the PDSCH repetition number N=1.

In one embodiment, determining the PDCCH monitoring occasion set includes:
    determining the PDCCH monitoring occasion set based on the configured number of PDSCH repetitions when it is configured to monitor only a PDCCH using DCI format 1-1;
    otherwise, determining the PDCCH monitoring occasion set based on the configured number of PDSCH repetitions and on the PDSCH repetition number N=1.

In one embodiment,
for each carrier, when it is configured to monitor only the PDCCH using DCI format 1-1,
    determining a PDCCH monitoring occasion set corresponding to the carrier based on the configured number of PDSCH repetitions;
    otherwise, determining the PDCCH monitoring occasion set corresponding to the carrier based on the configured number of PDSCH repetitions and on the PDSCH repetition number N=1;
or
for a group of carriers in case of carrier aggregation, when it is configured for each carrier in the group of carriers to monitor only the PDCCH using DCI format 1-1, for each carrier in the group of carriers,
    determining a PDCCH monitoring occasion set corresponding to the each carrier in the group of carriers based on the configured number of PDSCH repetitions;
    otherwise, determining the PDCCH monitoring occasion set corresponding to the each carrier in the group of carriers based on the configured number of PDSCH repetitions and on the PDSCH repetition number N=1.

In one embodiment, determining the PDCCH monitoring occasion set includes:
    determining the PDCCH monitoring occasion set based on the PDSCH repetition number N=1 when it is configured to monitor only a PDCCH using DCI format 1-0;
    determining the PDCCH monitoring occasion set based on the configured number of PDSCH repetitions when it is configured to monitor only a PDCCH using DCI format 1-1;
    otherwise, determining the PDCCH monitoring occasion set based on the configured number of PDSCH repetitions and on the PDSCH repetition number N=1.

In one embodiment,
for each carrier,
    when it is configured to monitor only the PDCCH using DCI format 1-0, determining a PDCCH monitoring occasion set corresponding to the carrier based on the PDSCH repetition number N=1;
    when it is configured to monitor only the PDCCH using DCI format 1-1, determining the PDCCH monitoring occasion set corresponding to the carrier based on the configured number of PDSCH repetitions;
    otherwise, determining the PDCCH monitoring occasion set corresponding to the carrier based on the configured number of PDSCH repetitions and on the PDSCH repetition number N=1;

or for a group of carriers in case of carrier aggregation, when it is configured for each carrier in the group of carriers to monitor only the PDCCH using DCI format 1-0, for each carrier in the group of carriers, determining a PDCCH monitoring occasion set corresponding to the each carrier in the group of carriers based on the PDSCH repetition number N=1;

when it is configured for each carrier in the group of carriers to monitor only the PDCCH using DCI format 1-1, for each carrier in the group of carriers, determining the PDCCH monitoring occasion set corresponding to the each carrier in the group of carriers based on the configured number of PDSCH repetitions;

otherwise, determining the PDCCH monitoring occasion set corresponding to the each carrier in the group of carriers based on the configured number of PDSCH repetitions and on the PDSCH repetition number N=1.

Some embodiments of the present application provide a device for determining a dynamic HARQ-ACK codebook, including: a processor, a memory and a transceiver;

the processor is configured to read a program in the memory and perform:

determining a PDCCH monitoring occasion set based on the configured number of PDSCH repetitions and/or on the PDSCH repetition number N=1; and the configured number of PDSCH repetitions is greater than 1;

determining the dynamic HARQ-ACK codebook based on the PDCCH monitoring occasion set.

In one embodiment, the processor configured to determine the PDCCH monitoring occasion set is configured to perform:

determining the PDCCH monitoring occasion set based on the configured number of PDSCH repetitions and on the PDSCH repetition number N=1, when it is configured to monitor a PDCCH using Downlink Control Information, DCI, format 1-1;

otherwise, determining the PDCCH monitoring occasion set based on the configured number of PDSCH repetitions.

In one embodiment, the processor is configured to perform:

for each carrier, when it is configured to monitor the PDCCH using DCI format 1-1, determining a PDCCH monitoring occasion set corresponding to the carrier based on the configured number of PDSCH repetitions and on the PDSCH repetition number N=1;

otherwise, determining the PDCCH monitoring occasion set corresponding to the carrier based on the configured number of PDSCH repetitions;

or for a group of carriers in case of carrier aggregation, when it is configured for at least one carrier in the group of carriers to monitor the PDCCH using DCI format 1-1, for each carrier in the group of carriers, determining a PDCCH monitoring occasion set corresponding to the each carrier in the group of carriers based on the configured number of PDSCH repetitions and on the PDSCH repetition number N=1;

otherwise, determining the PDCCH monitoring occasion set corresponding to the each carrier in the group of carriers based on the configured number of PDSCH repetitions.

In one embodiment, the processor configured to determine the PDCCH monitoring occasion set is configured to perform:

determining the PDCCH monitoring occasion set based on the configured number of PDSCH repetitions and on the PDSCH repetition number N=1 when it is configured to monitor a PDCCH using DCI format 1-0;

otherwise, determining the PDCCH monitoring occasion set based on the configured number of PDSCH repetitions.

In one embodiment, the processor is configured to perform:

for each carrier, when it is configured to monitor the PDCCH using DCI format 1-0, determining a PDCCH monitoring occasion set corresponding to the carrier based on the configured number of PDSCH repetitions and on the PDSCH repetition number N=1;

otherwise, determining the PDCCH monitoring occasion set corresponding to the carrier based on the configured number of PDSCH repetitions;

or for a group of carriers in case of carrier aggregation, when it is configured for at least one carrier in the group of carriers to monitor the PDCCH using DCI format 1-0, for each carrier in the group of carriers, determining a PDCCH monitoring occasion set corresponding to the each carrier in the group of carriers based on the configured number of PDSCH repetitions and on the PDSCH repetition number N=1;

otherwise, determining the PDCCH monitoring occasion set corresponding to the each carrier in the group of carriers based on the configured number of PDSCH repetitions.

In one embodiment, the processor configured to determine the PDCCH monitoring occasion set is configured to perform:

determining the PDCCH monitoring occasion set based on the configured number of PDSCH repetitions and on the PDSCH repetition number N=1 when it is configured to monitor a PDCCH using DCI format 1-1 and a PDCCH using DCI format 1-0;

otherwise, determining the PDCCH monitoring occasion set based on the configured number of PDSCH repetitions.

In one embodiment, the processor is configured to perform:

for each carrier, when it is configured to monitor the PDCCH using DCI format 1-1 and the PDCCH using DCI format 1-0, determining a PDCCH monitoring occasion set corresponding to the carrier based on the configured number of PDSCH repetitions and on the PDSCH repetition number N=1;

otherwise, determining the PDCCH monitoring occasion set corresponding to the carrier based on the configured number of PDSCH repetitions;

or for a group of carriers in case of carrier aggregation, when it is configured for at least one carrier in the group of carriers to monitor the PDCCH using DCI format 1-1 and for at least one carrier to monitor the PDCCH using DCI format 1-0, for each carrier in the group of carriers, determining a PDCCH monitoring occasion set corresponding to the each carrier in the group of carriers based on the configured number of PDSCH repetitions and on the PDSCH repetition number N=1;

otherwise, determining the PDCCH monitoring occasion set corresponding to the each carrier in the group of carriers based on the configured number of PDSCH repetitions.

In one embodiment, the processor configured to determine the PDCCH monitoring occasion set is configured to perform:

determining the PDCCH monitoring occasion set based on the PDSCH repetition number N=1 when it is configured to monitor only a PDCCH using DCI format 1-0;

otherwise, determining the PDCCH monitoring occasion set based on the configured number of PDSCH repetitions and on the PDSCH repetition number N=1.

In one embodiment, the processor is configured to perform:

for each carrier, when it is configured to monitor only the PDCCH using DCI format 1-0,
determining a PDCCH monitoring occasion set corresponding to the carrier based on the PDSCH repetition number N=1;
otherwise, determining the PDCCH monitoring occasion set corresponding to the carrier based on the configured number of PDSCH repetitions and on the PDSCH repetition number N=1;

or for a group of carriers in case of carrier aggregation, when it is configured for each carrier in the group of carriers to monitor only the PDCCH using DCI format 1-0, for each carrier in the group of carriers,
determining a PDCCH monitoring occasion set corresponding to the each carrier in the group of carriers based on the PDSCH repetition number N=1;
otherwise, determining a PDCCH monitoring occasion set corresponding to the each carrier in the group of carriers based on the configured number of PDSCH repetitions and on the PDSCH repetition number N=1.

In one embodiment, the processor configured to determine the PDCCH monitoring occasion set is configured to perform:

determining the PDCCH monitoring occasion set based on the configured number of PDSCH repetitions when it is configured to monitor only a PDCCH using DCI format 1-1;

otherwise, determining the PDCCH monitoring occasion set based on the configured number of PDSCH repetitions and on the PDSCH repetition number N=1.

In one embodiment, the processor is configured to perform:

for each carrier, when it is configured to monitor only the PDCCH using DCI format 1-1,
determining a PDCCH monitoring occasion set corresponding to the carrier based on the configured number of PDSCH repetitions;
otherwise, determining the PDCCH monitoring occasion set corresponding to the carrier based on the configured number of PDSCH repetitions and on the PDSCH repetition number N=1;

or for a group of carriers in case of carrier aggregation, when it is configured for each carrier in the group of carriers to monitor only the PDCCH using DCI format 1-1, for each carrier in the group of carriers,
determining a PDCCH monitoring occasion set corresponding to the each carrier in the group of carriers based on the configured number of PDSCH repetitions;
otherwise, determining the PDCCH monitoring occasion set corresponding to the each carrier in the group of carriers based on the configured number of PDSCH repetitions and on the PDSCH repetition number N=1.

In one embodiment, the processor configured to determine the PDCCH monitoring occasion set is configured to perform:

determining the PDCCH monitoring occasion set based on the PDSCH repetition number N=1 when it is configured to monitor only a PDCCH using DCI format 1-0;

determining the PDCCH monitoring occasion set based on the configured number of PDSCH repetitions when it is configured to monitor only a PDCCH using DCI format 1-1;

otherwise, determining the PDCCH monitoring occasion set based on the configured number of PDSCH repetitions and on the PDSCH repetition number N=1.

In one embodiment, the processor is configured to perform:

for each carrier,
when it is configured to monitor only the PDCCH using DCI format 1-0, determining a PDCCH monitoring occasion set corresponding to the carrier based on the PDSCH repetition number N=1;
when it is configured to monitor only the PDCCH using DCI format 1-1, determining the PDCCH monitoring occasion set corresponding to the carrier based on the configured number of PDSCH repetitions;
otherwise, determining the PDCCH monitoring occasion set corresponding to the carrier based on the configured number of PDSCH repetitions and on the PDSCH repetition number N=1;

or for a group of carriers in case of carrier aggregation,
when it is configured for each carrier in the group of carriers to monitor only the PDCCH using DCI format 1-0, for each carrier in the group of carriers, determining a PDCCH monitoring occasion set corresponding to the carrier based on the PDSCH repetition number N=1;
when it is configured for each carrier in the group of carriers to monitor only the PDCCH using DCI format 1-1, for each carrier in the group of carriers, determining the PDCCH monitoring occasion set corresponding to the each carrier in the group of carriers based on the configured number of PDSCH repetitions;
otherwise, determining the PDCCH monitoring occasion set corresponding to the each carrier in the group of carriers based on the configured number of PDSCH repetitions and on the PDSCH repetition number N=1.

Some embodiments of the present application provide another device for determining a dynamic HARQ-ACK codebook, including:

a processing device configured to determine a Physical Downlink Control Channel, PDCCH, monitoring occasion set based on a configured number of Physical Downlink Shared Channel, PDSCH, repetitions and/or on the PDSCH repetition number N=1; and the configured number of PDSCH repetitions is greater than 1;
a determining device configured to determine the dynamic HARQ-ACK codebook based on the PDCCH monitoring occasion set.

In one embodiment, the processing device configured to determine the PDCCH monitoring occasion set is configured to perform:
determining the PDCCH monitoring occasion set based on the configured number of PDSCH repetitions and on the PDSCH repetition number N=1, when it is configured to monitor a PDCCH using Downlink Control Information, DCI, format 1-1;
otherwise, determining the PDCCH monitoring occasion set based on the configured number of PDSCH repetitions.

In one embodiment, the processing device is configured to perform:
for each carrier, when it is configured to monitor the PDCCH using DCI format 1-1,
determining a PDCCH monitoring occasion set corresponding to the carrier based on the configured number of PDSCH repetitions and on the PDSCH repetition number N=1;
otherwise, determining the PDCCH monitoring occasion set corresponding to the carrier based on the configured number of PDSCH repetitions;
or
for a group of carriers in case of carrier aggregation, when it is configured for at least one carrier in the group of carriers to monitor the PDCCH using DCI format 1-1, for each carrier in the group of carriers,
determining a PDCCH monitoring occasion set corresponding to the each carrier in the group of carriers based on the configured number of PDSCH repetitions and on the PDSCH repetition number N=1;
otherwise, determining the PDCCH monitoring occasion set corresponding to the each carrier in the group of carriers based on the configured number of PDSCH repetitions.

In one embodiment, the processing device configured to determine the PDCCH monitoring occasion set is configured to perform:
determining the PDCCH monitoring occasion set based on the configured number of PDSCH repetitions and on the PDSCH repetition number N=1 when it is configured to monitor a PDCCH using DCI format 1-0;
otherwise, determining the PDCCH monitoring occasion set based on the configured number of PDSCH repetitions.

In one embodiment, the processing device is configured to perform:
for each carrier, when it is configured to monitor the PDCCH using DCI format 1-0,
determining a PDCCH monitoring occasion set corresponding to the carrier based on the configured number of PDSCH repetitions and on the PDSCH repetition number N=1;
otherwise, determining the PDCCH monitoring occasion set corresponding to the carrier based on the configured number of PDSCH repetitions;
or
for a group of carriers in case of carrier aggregation, when it is configured for at least one carrier in the group of carriers to monitor the PDCCH using DCI format 1-0, for each carrier in the group of carriers,
determining a PDCCH monitoring occasion set corresponding to the each carrier in the group of carriers based on the configured number of PDSCH repetitions and on the PDSCH repetition number N=1;
otherwise, determining the PDCCH monitoring occasion set corresponding to the each carrier in the group of carriers based on the configured number of PDSCH repetitions.

In one embodiment, the processing device configured to determine the PDCCH monitoring occasion set is configured to perform:
determining the PDCCH monitoring occasion set based on the configured number of PDSCH repetitions and on the PDSCH repetition number N=1 when it is configured to monitor a PDCCH using DCI format 1-1 and a PDCCH using DCI format 1-0;
otherwise, determining the PDCCH monitoring occasion set based on the configured number of PDSCH repetitions.

In one embodiment, the processing device is configured to perform:
for each carrier, when it is configured to monitor the PDCCH using DCI format 1-1 and the PDCCH using DCI format 1-0,
determining a PDCCH monitoring occasion set corresponding to the carrier based on the configured number of PDSCH repetitions and on the PDSCH repetition number N=1;
otherwise, determining the PDCCH monitoring occasion set corresponding to the carrier based on the configured number of PDSCH repetitions;
or
for a group of carriers in case of carrier aggregation, when it is configured for at least one carrier in the group of carriers to monitor the PDCCH using DCI format 1-1 and for at least one carrier in the group of carriers to monitor the PDCCH using DCI format 1-0, for each carrier in the group of carriers,
determining a PDCCH monitoring occasion set corresponding to the each carrier in the group of carriers based on the configured number of PDSCH repetitions and on the PDSCH repetition number N=1;
otherwise, determining the PDCCH monitoring occasion set corresponding to the each carrier in the group of carriers based on the configured number of PDSCH repetitions.

In one embodiment, the processing device configured to determine the PDCCH monitoring occasion set is configured to perform:
determining the PDCCH monitoring occasion set based on the PDSCH repetition number N=1 when it is configured to monitor only a PDCCH using DCI format 1-0;
otherwise, determining the PDCCH monitoring occasion set based on the configured number of PDSCH repetitions and on the PDSCH repetition number N=1.

In one embodiment, the processing device is configured to perform:
for each carrier, when it is configured to monitor only the PDCCH using DCI format 1-0,
determining a PDCCH monitoring occasion set corresponding to the carrier based on the PDSCH repetition number N=1;
otherwise, determining the PDCCH monitoring occasion set corresponding to the carrier based on the configured number of PDSCH repetitions and on the PDSCH repetition number N=1;

or
for a group of carriers in case of carrier aggregation, when it is configured for each carrier in the group of carriers to monitor only the PDCCH using DCI format 1-0, for each carrier in the group of carriers,
determining a PDCCH monitoring occasion set corresponding to the each carrier in the group of carriers based on the PDSCH repetition number N=1;
otherwise, determining a PDCCH monitoring occasion set corresponding to the each carrier in the group of carriers based on the configured number of PDSCH repetitions and on the PDSCH repetition number N=1.

In one embodiment, the processing device configured to determine the PDCCH monitoring occasion set is configured to perform:
determining the PDCCH monitoring occasion set based on the configured number of PDSCH repetitions when it is configured to monitor only a PDCCH using DCI format 1-1;
otherwise, determining the PDCCH monitoring occasion set based on the configured number of PDSCH repetitions and on the PDSCH repetition number N=1.

In one embodiment, the processing device is configured to perform:
for each carrier, when it is configured to monitor only the PDCCH using DCI format 1-1,
determining a PDCCH monitoring occasion set corresponding to the carrier based on the configured number of PDSCH repetitions;
otherwise, determining the PDCCH monitoring occasion set corresponding to the carrier based on the configured number of PDSCH repetitions and on the PDSCH repetition number N=1;
or
for a group of carriers in case of carrier aggregation, when it is configured for each carrier in the group of carriers to monitor only the PDCCH using DCI format 1-1, for each carrier in the group of carriers,
determining a PDCCH monitoring occasion set corresponding to the each carrier in the group of carriers based on the configured number of PDSCH repetitions;
otherwise, determining the PDCCH monitoring occasion set corresponding to the each carrier in the group of carriers based on the configured number of PDSCH repetitions and on the PDSCH repetition number N=1.

In one embodiment, the processing device configured to determine the PDCCH monitoring occasion set is configured to perform:
determining the PDCCH monitoring occasion set based on the PDSCH repetition number N=1 when it is configured to monitor only a PDCCH using DCI format 1-0;
determining the PDCCH monitoring occasion set based on the configured number of PDSCH repetitions when it is configured to monitor only a PDCCH using DCI format 1-1;
otherwise, determining the PDCCH monitoring occasion set based on the configured number of PDSCH repetitions and on the PDSCH repetition number N=1.

In one embodiment, the processing device is configured to perform:
for each carrier,
when it is configured to monitor only the PDCCH using DCI format 1-0, determining a PDCCH monitoring occasion set corresponding to the carrier based on the PDSCH repetition number N=1;
when it is configured to monitor only the PDCCH using DCI format 1-1, determining the PDCCH monitoring occasion set corresponding to the carrier based on the configured number of PDSCH repetitions;
otherwise, determining the PDCCH monitoring occasion set corresponding to the carrier based on the configured number of PDSCH repetitions and on the PDSCH repetition number N=1;
or
for a group of carriers in case of carrier aggregation,
when it is configured for each carrier in the group of carriers to monitor only the PDCCH using DCI format 1-0, for each carrier in the group of carriers, determining a PDCCH monitoring occasion set corresponding to the each carrier in the group of carriers based on the PDSCH repetition number N=1;
when it is configured for each carrier in the group of carriers to monitor only the PDCCH using DCI format 1-1, for each carrier in the group of carriers, determining the PDCCH monitoring occasion set corresponding to the each carrier in the group of carriers based on the configured number of PDSCH repetitions;
otherwise, determining the PDCCH monitoring occasion set corresponding to the each carrier in the group of carriers based on the configured number of PDSCH repetitions and on the PDSCH repetition number N=1.

Some embodiments of the present application further provide a computer storable medium storing a computer program thereon, where the program, when executed by a processor, implements the steps of the above method described in the embodiment.

The embodiments of the present application provide a solution of determining the PDCCH monitoring occasion set corresponding to the dynamic HARQ-ACK codebook based on the number of PDSCH repetitions configured by high-layer signaling and on PDSCH repetition number N=1 (i.e., non-repetitive transmission), to avoid the problem of inconsistent understanding of the dynamic HARQ-ACK codebook by the terminal and base station and then incorrect HARQ-ACK transmission caused by a fact that the HARQ-ACK when the PDSCH is scheduled by the PDCCH using DCI format 1-0 is omitted in the codebook due to the PDCCH monitoring occasion set being always determined based on the number of PDSCH repetitions configured by high-layer signaling.

BRIEF DESCRIPTION OF THE DRAWINGS

In order to illustrate the embodiments of the present application more clearly, the accompanying figures which need to be used in describing the embodiments will be introduced below briefly.

DETAILED DESCRIPTION

In the following, some terms in the embodiments of the present application are explained to facilitate the understanding.

(1) In the embodiments of the present application, the nouns "network" and "system" are often used alternately.

(2) The term "a plurality of" in the embodiments of the present application refers to two or more, and other quantifiers are similar thereto.

(3) "And/or" describes the association relationship of the associated objects, and indicates that there may be three relationships, for example, A and/or B may represent: only A, both A and B, and only B. The character "/" generally indicates that the associated objects have a kind of "or" relationship.

Both semi-static and dynamic HARQ-ACK codebook generation methods are supported in the 5G NR system. The HARQ-ACK codebook refers to an HARQ-ACK feedback sequence generated for the downlink transmission of which the HARQ-ACK feedback is performed at the same time domain location or on the same uplink channel.

Figure 1:
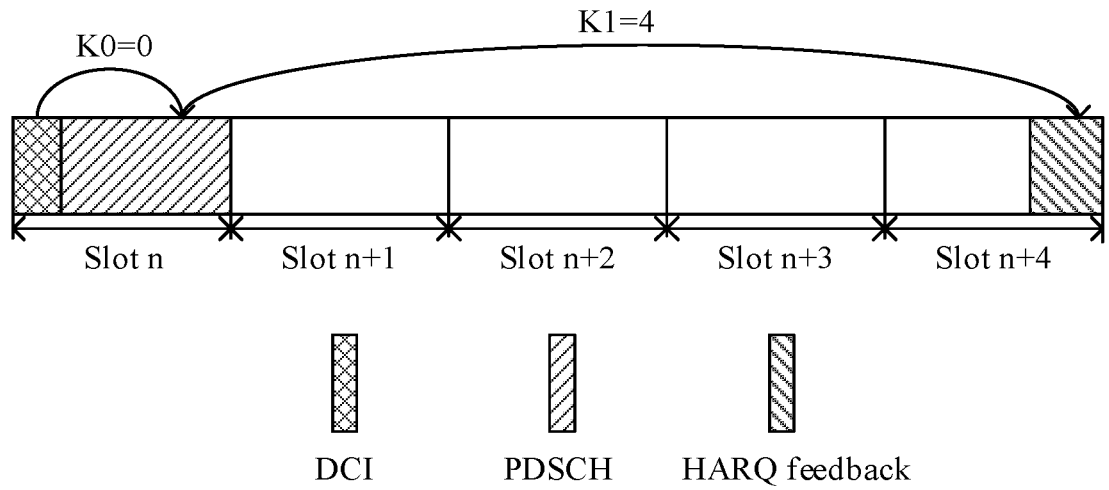
FIG. 1 is a schematic diagram of downlink scheduling timing and HARQ-ACK feedback timing in the background.
Figure 2:
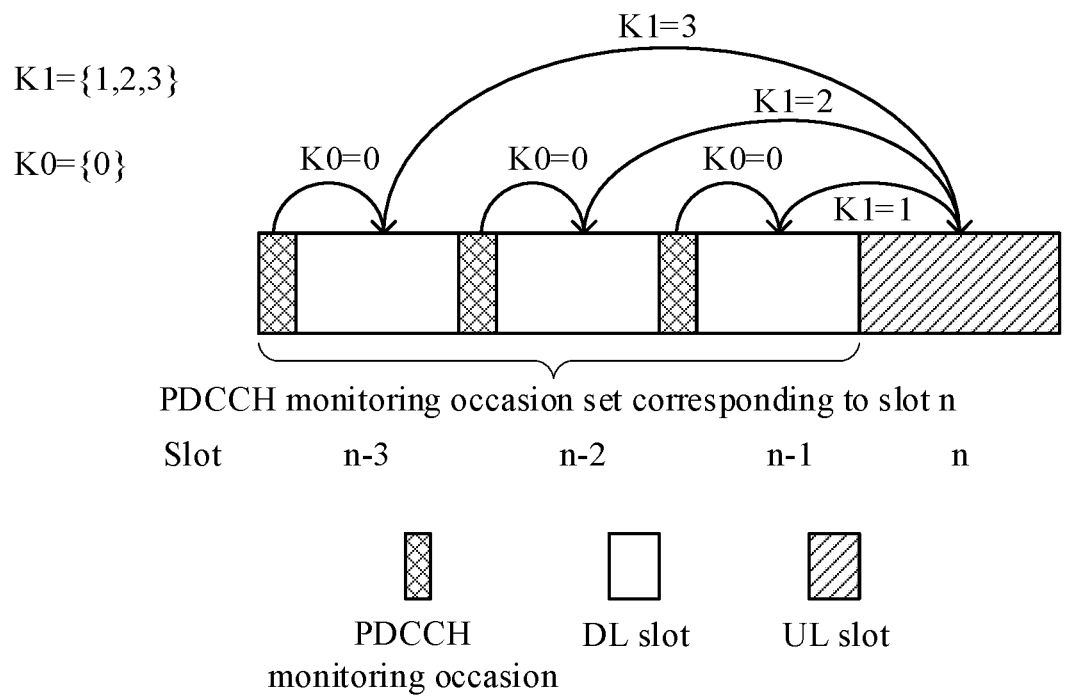
FIG. 2 is a schematic diagram of determining the PDCCH monitoring occasion set according to embodiments of the present application.

For the dynamic HARQ-ACK codebook, the HARQ-ACK sorting is performed based on the indication of Counter (C)-Downlink Assignment Index (DAI) field in the Downlink (DL) DCI, and the total number of bits of the HARQ-ACK codebook is determined based on the Total (T)-DAI field, so the codebook size can be dynamically changed at different feedback moments. In one embodiment, it may be determined that the PDCCH monitoring occasions corresponding to the active Bandwidth Part (BWP) on a carrier based on K1, K0 and the configured number of repetitions (assuming that the number of repetitions is configured), as shown in FIG. 2, which is a schematic diagram of determining the PDCCH monitoring occasions. Here, for simplicity, assuming that K0 is always 0, the actual K0 may be multiple values. If K0 has multiple values, multiple PDCCH monitoring occasions may be determined in one downlink slot of n-K1, and each slot may also include multiple PDCCH monitoring occasions. In the case of carrier aggregation, the full set of PDCCH monitoring occasions of all carriers is obtained based on the PDCCH monitoring occasions corresponding to each carrier, and the PDCCH monitoring occasions on different carriers may not be aligned in time, and then sorted firstly in time (time sequence) and then in frequency domain (that is, CC numbers from small to large). The terminal detects the PDCCH using DCI format 1-0 and/or format 1-1 in the determined PDCCH monitoring occasion set, and generates the HARQ-ACK codebook based on the DAI information in the received PDCCH.

Figure 3:
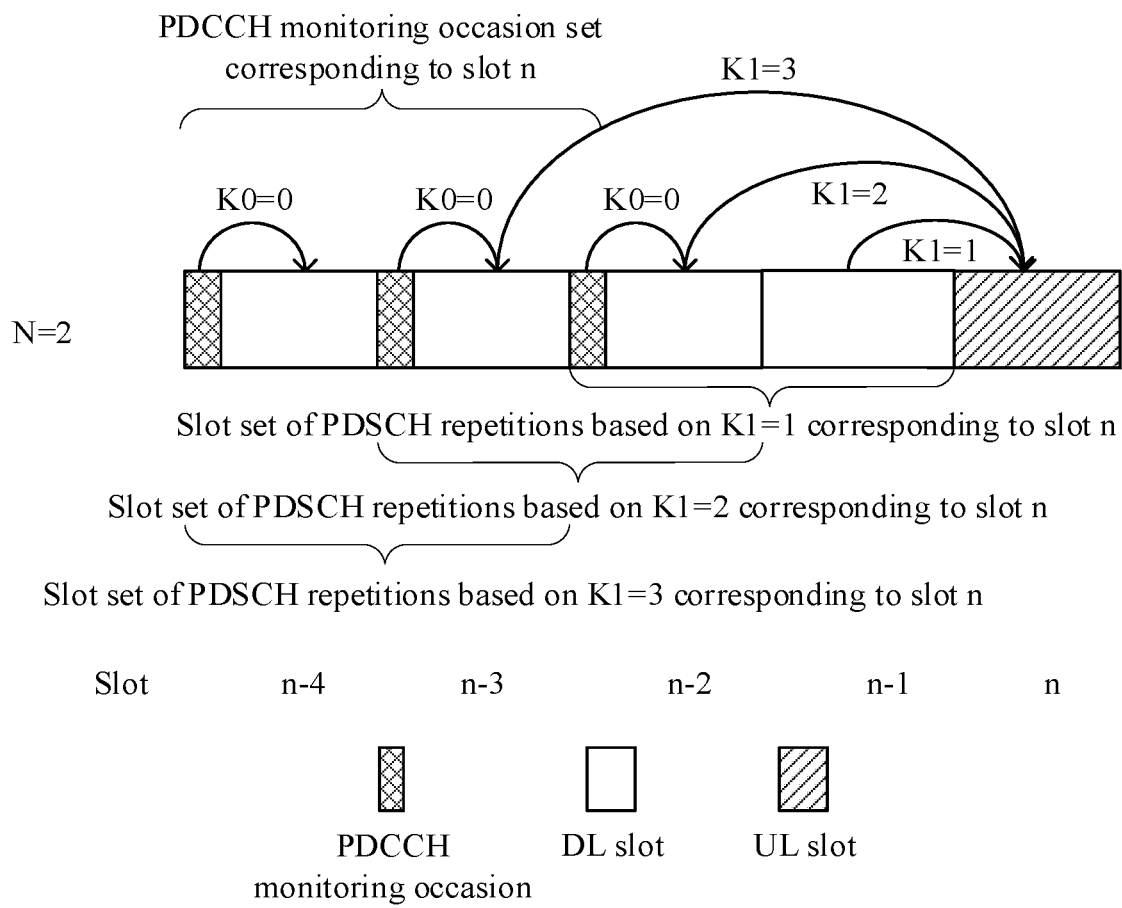
FIG. 3 is a schematic diagram of determining the PDCCH monitoring occasion set when repetition is applied to the PDSCH according to embodiments of the present application.

In the above process, when the number N of PDSCH repetitions is configured in the system and N is a value greater than 1, the scheduling timing (i.e., K0) of the repeated PDSCH is determined based on the first one of multiple slots occupied by the PDSCH repetitions, and the feedback timing (i.e., K1) of the repeatedly transmitted PDSCH is determined based on the last one of multiple slots occupied by the PDSCH repetitions. At this time, for the dynamic HARQ-ACK codebook, the PDCCH monitoring occasion needs to be determined based on N. That is, N slots between the downlink slots n-K1 to n-K1-N are taken as a group of slots for PDSCH repetitions when determining the HARQ-ACK codebook in the slot n. For this group of slots, the PDCCH monitoring occasion determined based on K0 is the PDCCH monitoring occasion corresponding to the slot n-K1-N. FIG. 3 shows the PDCCH monitoring occasion set when repetition is applied to the PDSCH.

In the Rel-15, when the number of repetitions is configured, the terminal may also perform non-repetitive (that is, N=1) PDSCH or SPS PDSCH release transmission to avoid the inconsistent understanding of the configured number of repetitions by the terminal and the base station in the Radio Resource Control (RRC) reconfiguration process (since the RRC reconfiguration may reconfigure the number of repetitions, this number is not used in the reconfiguration process). For example, when the PDSCH or SPS PDSCH release is scheduled by the PDCCH using DCI format 1-0, repetition is not applied to the PDSCH or SPS PDSCH release.

If the PDCCH monitoring occasion set of the dynamic HARQ-ACK codebook is determined based on the number of repetitions, the PDCCH monitoring occasions corresponding to certain non-repetitive PDSCH or SPS PDSCH releases cannot be included. That is, if the PDSCH in the slot n−1 is scheduled by the PDCCH using DCI format 1-0, the PDSCH transmission is not repeated, and the corresponding PDCCH monitoring occasion is in the slot n−1, as shown in FIGS. 2 and 3. In one embodiment, FIG. 3 does not contain the PDCCH monitoring occasion in the slot n−1 in FIG. 2. This will cause some of the HARQ-ACKs corresponding to the PDSCHs or SPS PDSCH releases scheduled by the PDCCH transmitted using DCI format 1-0 to be omitted from the dynamic HARQ-ACK codebook, resulting in the inconsistent understanding of the dynamic HARQ-ACK codebook by the terminal and the base station, and resulting in the wrong HARQ-ACK transmission.

In view of the above problem, embodiments of the present application provide a method for determining a dynamic HARQ-ACK codebook, in which a PDCCH monitoring occasion set is determined based on the configured number of PDSCH repetitions and on PDSCH repetition number N=1; and the configured number of PDSCH repetitions is greater than 1; and the dynamic HARQ-ACK codebook is determined based on the PDCCH monitoring occasion set.

It should be noted that the method for determining the dynamic HARQ-ACK codebook provided in the embodiments of the present application can be used for both the base station side and the terminal side, so that the terminal and the base station have the same understanding of the dynamic HARQ-ACK codebook.

The embodiments of the present application provide a solution of determining the PDCCH monitoring occasion set corresponding to the dynamic HARQ-ACK codebook based on two cases, in one of which the number of PDSCH repetitions configured by high-layer signaling, and in another one N=1 (i.e., non-repetitive transmission), to avoid the problem of inconsistent understanding of the dynamic HARQ-ACK codebook by the terminal and base station and then incorrect HARQ-ACK transmission caused by a fact that the HARQ-ACK when the PDSCH is scheduled by the PDCCH using DCI format 1-0 is omitted in the codebook due to the PDCCH monitoring occasion set being always determined based on the number of PDSCH repetitions configured by high-layer signaling.

In order to make the embodiments of the present application clearer, the present application will be further illustrated below in details with reference to the accompanying figures. The described embodiments are merely a part of the embodiments of the present application but not all the embodiments.

The embodiments of the present application will be further described in detail below.

Figure 4:
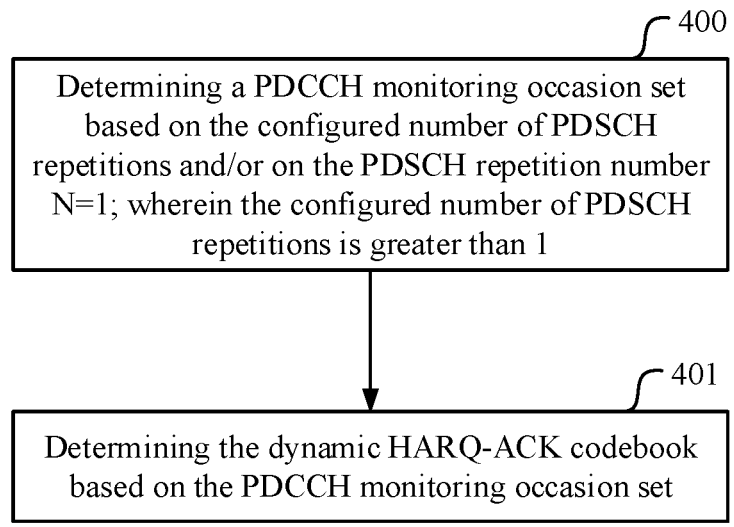
FIG. 4 is a flowchart of a method for determining a dynamic HARQ-ACK codebook according to embodiments of the present application.

As shown in FIG. 4, a method for determining a dynamic HARQ-ACK codebook in an embodiment of the present application includes the following.

Step 400: determining a PDCCH monitoring occasion set based on the configured number of PDSCH repetitions and/or on the PDSCH repetition number N=1; and the configured number of PDSCH repetitions is greater than 1.

Step 401: determining the dynamic HARQ-ACK codebook based on the PDCCH monitoring occasion set.

Here, the configured number of PDSCH repetitions in the embodiments of the present application is the number of PDSCH repetitions configured by a base station for a terminal through high-layer signaling.

In some embodiments, the base station configures the number of PDSCH repetitions for the terminal through the high-level parameter pdsch-AggregationFactor.

In step 400, the PDCCH monitoring occasion set is determined based on the PDCCH monitoring occasions determined based on the configured number of PDSCH repetitions and/or based on the PDSCH repetition number N=1.

Here, a first part of PDCCH monitoring occasions are determined based on the configured number of PDSCH repetitions, and/or a second part of PDCCH monitoring occasions is determined based on the PDSCH repetition number N=1, and the first part of PDCCH monitoring occasions and/or the second part of PDCCH monitoring occasions forms the PDCCH monitoring occasion set.

In step 401, the way to determine the dynamic HARQ-ACK codebook based on the PDCCH monitoring occasion set can refer to the existing ways, which will not be described in detail here.

In step 400, one method is to always determine the PDCCH monitoring occasion set based on the configured number of PDSCH repetitions and based on the PDSCH repetition number N=1, no matter what DCI format PDCCH is configured for detection.

In step 400, another method is based on one of a case with the configured number of PDSCH repetitions and a case with the PDSCH repetition number N=1 to determine the PDCCH monitoring occasion set, based on which DCI format used by the PDCCH is configured for detection.

The method for determining the dynamic HARQ-ACK codebook in the embodiments of the present application will be illustrated below in combination with different cases.

1. Configuring to Monitor a PDCCH Using DCI Format 1-1.

In one embodiment, when a PDCCH using DCI format 1-1 needs to be monitored, the PDCCH monitoring occasion set is determined based on the configured number of PDSCH repetitions and on the PDSCH repetition number N=1; otherwise, the PDCCH monitoring occasion set is determined based on the configured number of PDSCH repetitions.

For each carrier, when a PDCCH using DCI format 1-1 is configured to be monitored, a PDCCH monitoring occasion set corresponding to the carrier is determined based on the configured number of PDSCH repetitions and on the PDSCH repetition number N=1; otherwise, the PDCCH monitoring occasion set corresponding to the carrier is determined based on the configured number of PDSCH repetitions.

Alternatively, for a group of carriers in case of carrier aggregation, when it is configured for at least one carrier in the group of carriers to monitor a PDCCH using DCI format 1-1, for each carrier in the group of carriers, a PDCCH monitoring occasion set corresponding to the carrier is determined based on the configured number of PDSCH repetitions and on the PDSCH repetition number N=1; otherwise, a PDCCH monitoring occasion set corresponding to the each carrier in the group of carriers is determined based on the configured number of PDSCH repetitions.

2. Configuring to Monitor a PDCCH Using DCI Format 1-0.

In one embodiment, when a PDCCH using DCI format 1-0 needs to be monitored, the PDCCH monitoring occasion set is determined based on the configured number of PDSCH repetitions and on the PDSCH repetition number N=1; otherwise, the PDCCH monitoring occasion set is determined based on the configured number of PDSCH repetitions.

For each carrier, when it is configured to monitor a PDCCH using DCI format 1-0, a PDCCH monitoring occasion set corresponding to the carrier is determined based on the configured number of PDSCH repetitions and on the PDSCH repetition number N=1; otherwise, the PDCCH monitoring occasion set corresponding to the carrier is determined based on the configured number of PDSCH repetitions.

Alternatively, for a group of carriers in case of carrier aggregation, when it is configured for at least one carrier in the group of carriers that a PDCCH using DCI format 1-0 needs to be monitored, for each carrier in the group of carriers, a PDCCH monitoring occasion set corresponding to the carrier is determined based on the configured number of PDSCH repetitions and on the PDSCH repetition number N=1; otherwise, a PDCCH monitoring occasion set corresponding to each carrier in the group of carriers is determined based on the configured number of PDSCH repetitions.

3. Configuring to Monitor Both PDCCHs Using DCI Format 1-1 and DCI Format 1-0.

In one embodiment, when it is configured to monitor the PDCCHs using DCI format 1-1 and DCI format 1-0, the PDCCH monitoring occasion set is determined based on the configured number of PDSCH repetitions and on the PDSCH repetition number N=1; otherwise, the PDCCH monitoring occasion set is determined based on the configured number of PDSCH repetitions.

For each carrier, when it is configured to monitor PDCCHs using DCI format 1-1 and DCI format 1-0, a PDCCH monitoring occasion set corresponding to the carrier is determined based on the configured number of PDSCH repetitions and on the PDSCH repetition number N=1; otherwise, the PDCCH monitoring occasion set corresponding to the carrier is determined based on the configured number of PDSCH repetitions.

Alternatively, for a group of carriers in case of carrier aggregation, when it is configured for at least one carrier in the group of carriers to monitor a PDCCH using DCI format 1-1 and for at least one carrier that a PDCCH using DCI format 1-0 needs to be monitored, for each carrier in the group of carriers, a PDCCH monitoring occasion set corresponding to the carrier is determined based on the configured number of PDSCH repetitions and on the PDSCH repetition number N=1; otherwise, a PDCCH monitoring occasion set corresponding to each carrier in the group of carriers is determined based on the configured number of PDSCH repetitions.

It should be noted here that the case that it is configured for at least one carrier in the group of carriers to monitor a PDCCH using DCI format 1-1 and for at least one carrier to monitor a PDCCH using DCI format 1-0 may specifically be: it is configured for the same carrier in a group of carriers that the PDCCH using DCI format 1-1 and the PDCCH using DCI format 1-0 need to be monitored; or it is configured for one carrier in the group of carriers to monitor the PDCCH using DCI format 1-1, and for another carrier to monitor the PDCCH using DCI format 1-0.

4. Configuring to Monitor Only a PDCCH Using DCI Format 1-0.

In one embodiment, when it configured to monitor only a PDCCH using DCI format 1-0, the PDCCH monitoring occasion set is determined based on the PDSCH repetition number N=1; otherwise, the PDCCH monitoring occasion set is determined based on the configured number of PDSCH repetitions and on the PDSCH repetition number N=1.

It should be noted that, in this case, the DCI format 1-1 can be used by default if the number of repetitions greater than 1 is configured.

For each carrier, when the carrier is configured for detecting a PDCCH only using DCI format 1-0, a PDCCH monitoring occasion set corresponding to the carrier is determined based on the PDSCH repetition number N=1; otherwise, the PDCCH monitoring occasion set corresponding to the carrier is determined based on the configured number of PDSCH repetitions and on the PDSCH repetition number N=1.

Or, For a group of carriers in case of carrier aggregation, when each carrier in the group of carriers is configured for detecting only a PDCCH using DCI format 1-0, for each carrier in the group of carriers, a PDCCH monitoring occasion set corresponding to the carrier is determined based on the PDSCH repetition number N=1; otherwise, a PDCCH monitoring occasion set corresponding to each carrier in the group of carriers is determined based on the configured number of PDSCH repetitions and on the PDSCH repetition number N=1.

5. Configuring to Monitor Only a PDCCH Using DCI Format 1-1.

In one embodiment, when it configured to monitor only a PDCCH using DCI format 1-1, the PDCCH monitoring occasion set is determined based on the configured number of PDSCH repetitions; otherwise, the PDCCH monitoring occasion set is determined based on the configured number of PDSCH repetitions and on the PDSCH repetition number N=1.

For each carrier, when the carrier is configured for detecting only a PDCCH using DCI format 1-1, a PDCCH monitoring occasion set corresponding to the carrier is determined based on the configured number of PDSCH repetitions; otherwise, the PDCCH monitoring occasion set corresponding to the carrier is determined based on the configured number of PDSCH repetitions and on the PDSCH repetition number N=1.

Or, for a group of carriers in case of carrier aggregation, when each carrier in the group of carriers is configured for detecting only a PDCCH using DCI format 1-1, for each carrier in the group of carriers, a PDCCH monitoring occasion set corresponding to the carrier is determined based on the configured number of PDSCH repetitions; otherwise, a PDCCH monitoring occasion set corresponding to each carrier in the group of carriers is determined based on the configured number of PDSCH repetitions and on the PDSCH repetition number N=1.

6. Configuring to Monitor Only a PDCCH Using DCI Format 1-0, and/or to Monitor Only a PDCCH Using DCI Format 1-1.

In one embodiment, when it is configured to monitor only a PDCCH using DCI format 1-0, the PDCCH monitoring occasion set is determined based on the PDSCH repetition number N=1;

when it is configured to monitor only a PDCCH using DCI format 1-1, the PDCCH monitoring occasion set is determined based on the configured number of PDSCH repetitions;

otherwise, the PDCCH monitoring occasion set is determined based on the configured number of PDSCH repetitions and on the PDSCH repetition number N=1.

It should be noted here that, the above "otherwise" case means that the first two conditions in Case 6 are not met. That is to say, when that the PDCCHs using DCI format 1-0 and that DCI format 1-1 need to be monitored are configured at the same time, the PDCCH monitoring occasion set is determined based on the configured number of PDSCH repetitions and on the PDSCH repetition number N=1.

For each carrier, when the carrier is configured for detecting only a PDCCH using DCI format 1-0, a PDCCH monitoring occasion set corresponding to the carrier is determined based on the PDSCH repetition number N=1; when the carrier is configured for detecting only a PDCCH using DCI format 1-1, the PDCCH monitoring occasion set corresponding to the carrier is determined based on the configured number of PDSCH repetitions; otherwise, the PDCCH monitoring occasion set corresponding to the carrier is determined based on the configured number of PDSCH repetitions and on the PDSCH repetition number N=1.

Or, for a group of carriers in case of carrier aggregation, when each carrier in the group of carriers is configured for detecting only a PDCCH using DCI format 1-0, for each carrier in the group of carriers, a PDCCH monitoring occasion set corresponding to the carrier is determined based on the PDSCH repetition number N=1; when each carrier in the group of carriers is configured for detecting only a PDCCH using DCI format 1-1, for each carrier in the group of carriers, a PDCCH monitoring occasion set corresponding to the carrier is determined based on the configured number of PDSCH repetitions; otherwise, a PDCCH monitoring occasion set corresponding to each carrier in the group of carriers is determined based on the configured number of PDSCH repetitions and on the PDSCH repetition number N=1.

The method for determining the PDCCH monitoring occasion set will be described below in conjunction with some embodiments.

Assuming that the RRC is configured with pdsch-AggregationFactor=2, the configured number of PDSCH repetitions is 2. It is assumed that K1={1, 2, 3}, and that only K0=0 is defined in the time domain scheduling resource (SLIV) table corresponding to the PDSCH.

In one way, the PDCCH monitoring occasion corresponding to each carrier can always be determined based on N=2 and N=1.

In another way, the method for determining the PDCCH monitoring occasion can be determined based on the DCI format configured for the PDCCH, as follows.

For the case of configuring to monitor the PDCCH using DCI format 1-1:

for each carrier, when the carrier is configured for detecting a PDCCH using DCI format 1-1, the PDCCH monitoring occasion set corresponding to the carrier needs to be determined based on two cases of N=2 and N=1; otherwise, the PDCCH monitoring occasion set corresponding to the carrier needs to be determined based on the case of N=2;

for a group of carriers in case of carrier aggregation, when it is configured for at least one carrier in the group of carriers to monitor a PDCCH using DCI format 1-1, for each carrier in the group of carriers, the PDCCH monitoring occasion set corresponding to each carrier needs to be determined based on two cases of N=2 and N=1; otherwise, the PDCCH monitoring occasion set corresponding to each carrier needs to be determined based on the case of N=2. After the PDCCH monitoring occasion set corresponding to each carrier in a group of carriers is determined, the union of the respective PDCCH monitoring occasion sets corresponding to all the carriers is taken as the final PDCCH monitoring occasion set.

For the case of configuring to monitor the PDCCH using DCI format 1-0:

for each carrier, when the carrier is configured for detecting a PDCCH using DCI format 1-0, the PDCCH monitoring occasion set corresponding to the carrier needs to be determined based on two cases of N=2 and N=1; otherwise, the PDCCH monitoring occasion set corresponding to the carrier needs to be determined based on the case of N=2;

for a group of carriers in case of carrier aggregation, when it is configured for at least one carrier in the group of carriers to monitor a PDCCH using DCI format 1-0, for each carrier in the group of carriers, the PDCCH monitoring occasion set corresponding to each carrier needs to be determined based on two cases of N=2 and N=1; otherwise, the PDCCH monitoring occasion set corresponding to each carrier needs to be determined based on the case of N=2. After the PDCCH monitoring occasion set corresponding to each carrier in a group of carriers is determined, the union of the respective PDCCH monitoring occasion sets corresponding to all the carriers is taken as the final PDCCH monitoring occasion set.

For the case of configuring that the PDCCHs using DCI format 1-1 and DCI format 1-0 need to be monitored:

for each carrier, when that PDCCHs using DCI format 1-1 and DCI format 1-0 need to be monitored is configured, the PDCCH monitoring occasion set corresponding to the carrier needs to be determined based on two cases of N=2 and N=1; otherwise, the PDCCH monitoring occasion set corresponding to the carrier needs to be determined based on the case of N=2;

for a group of carriers in case of carrier aggregation, when it is configured for at least one carrier in the group of carriers to monitor a PDCCH using DCI format 1-1 and for at least one carrier to monitor a PDCCH using DCI format 1-0, for each carrier in the group of carriers, the PDCCH monitoring occasion set corresponding to each carrier needs to be determined based on two cases of N=2 and N=1; otherwise, the PDCCH monitoring occasion set corresponding to each carrier needs to be determined based on the case of N=2. After the PDCCH monitoring occasion set corresponding to each carrier in a group of carriers is determined, the union of the respective PDCCH monitoring occasion sets corresponding to all the carriers is taken as the final PDCCH monitoring occasion set.

For the case of configuring to monitor only the PDCCH using DCI format 1-0:

for each carrier, when it is configured to monitor only a PDCCH using DCI format 1-0, the PDCCH monitoring occasion set corresponding to the carrier needs to be determined based on the case of N=1; otherwise, the PDCCH monitoring occasion set corresponding to the carrier needs to be determined based on two cases of N=2 and N=1;

for a group of carriers in case of carrier aggregation, when each carrier in the group of carriers is configured for detecting only a PDCCH using DCI format 1-0, for each carrier in the group of carriers, the PDCCH monitoring occasion set corresponding to each carrier needs to be determined based on the case of N=1; otherwise, the PDCCH monitoring occasion set corresponding to each carrier needs to be determined based on two cases of N=2 and N=1. After the PDCCH monitoring occasion set corresponding to each carrier in a group of carriers is determined, the union of the respective PDCCH monitoring occasion sets corresponding to all the carriers is taken as the final PDCCH monitoring occasion set.

For the case of configuring to monitor only the PDCCH using DCI format 1-1:

for each carrier, when it is configured to monitor only a PDCCH using DCI format 1-1, the PDCCH monitoring occasion set corresponding to the carrier needs to be determined based on N=2; otherwise, the PDCCH monitoring occasion set corresponding to the carrier needs to be determined based on two values of N=2 and N=1;

for a group of carriers in case of carrier aggregation, when each carrier in the group of carriers is configured for detecting only a PDCCH using DCI format 1-1, for each carrier in the group of carriers, the PDCCH monitoring occasion set corresponding to each carrier needs to be determined based on the case of N=2; otherwise, the PDCCH monitoring occasion set corresponding to each carrier needs to be determined based on two cases of N=2 and N=1. After the PDCCH monitoring occasion set corresponding to each carrier in a group of carriers is determined, the union of the respective PDCCH monitoring occasion sets corresponding to all the carriers is taken as the final PDCCH monitoring occasion set.

For the case of configuring to monitor only a PDCCH using DCI format 1-0 and/or that only a PDCCH using DCI format 1-1:

for each carrier, when it is configured to monitor only a PDCCH using DCI format 1-0, the PDCCH monitoring occasion set corresponding to the carrier needs to be determined based on the case of N=1; when it is configured to monitor only a PDCCH using DCI format 1-1, the PDCCH monitoring occasion set corresponding to the carrier needs to be determined based on the case of N=2; otherwise, the PDCCH monitoring occasion set corresponding to the carrier needs to be determined based on two values of N=2 and N=1;

for a group of carriers in case of carrier aggregation, when each carrier in the group of carriers is configured for detecting only a PDCCH using DCI format 1-0, for each carrier in the group of carriers, the PDCCH monitoring occasion set corresponding to each carrier needs to be determined based on the case of N=1; when each carrier in the group of carriers is configured for detecting only a PDCCH using DCI format 1-1, for each carrier in the group of carriers, the PDCCH monitoring occasion set corresponding to each carrier needs to be determined based on the case of N=2; otherwise, the PDCCH monitoring occasion set corresponding to each carrier needs to be determined based on two cases of N=2 and N=1. After the PDCCH monitoring occasion set corresponding to each carrier in a group of carriers is determined, the union of the respective PDCCH monitoring occasion sets corresponding to all the carriers is taken as the final PDCCH monitoring occasion set.

Figure 5:
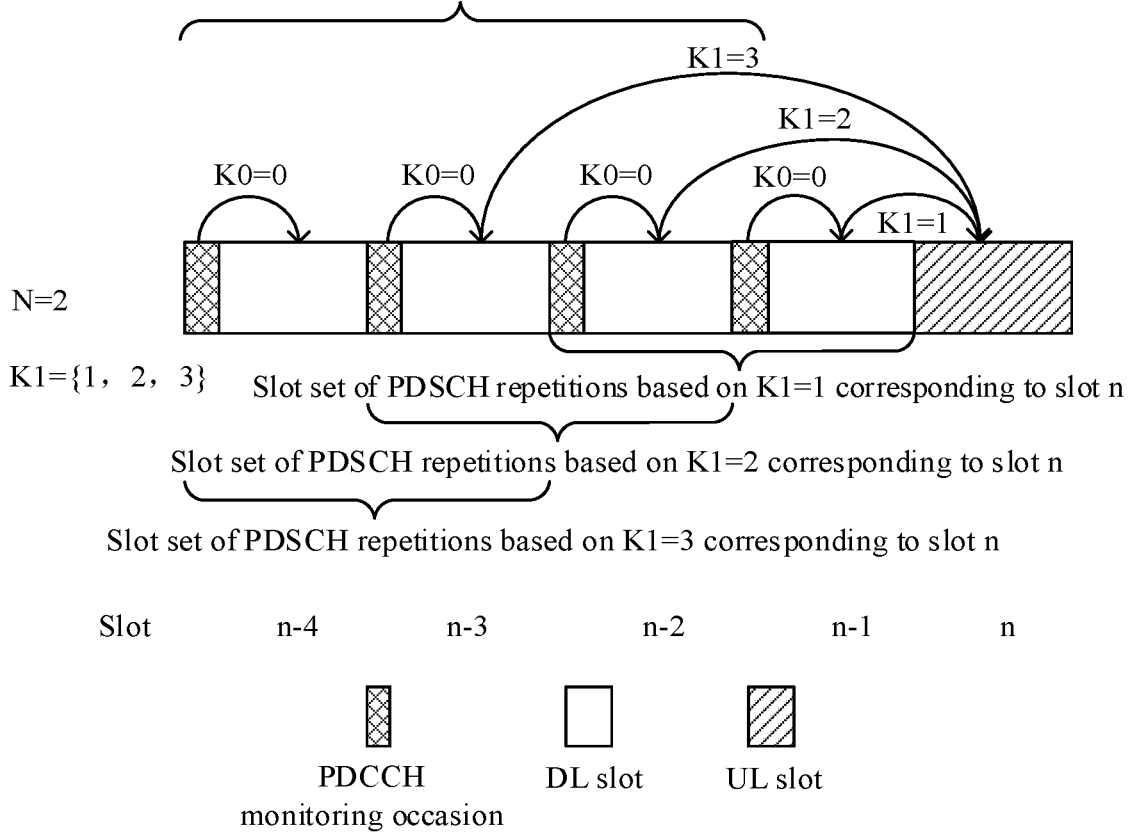
FIG. 5 is a schematic diagram of determining a PDCCH monitoring occasion set corresponding to a carrier according to embodiments of the present application.

When the PDCCH monitoring occasion set corresponding to the carrier is determined based on two cases of N=2 and N=1, as shown in FIG. 5, it can be determined based on the case of N=2 that the slots n−1 and n−2 forms the slot group of repetitions of PDSCH of which HARQ-ACK feedback is performed in slot n based on K1=1. Based on the first slot in the slot group and the case of K0=0, the PDCCH monitoring occasion corresponding to the slot group can be determined. Similarly, the PDCCH monitoring occasions corresponding to the slot groups of PDSCH repetitions corresponding to K1=2 and K1=3 can be determined, to obtain 3 PDCCH monitoring occasions from slot n−4 to slot n−2. Then, it can be determined based on the case of N=1 that the slot n−1 is the slot corresponding to the case of K1=1, and the PDCCH monitoring occasion corresponding to this slot, i.e., the PDCCH monitoring occasion in slot n−1, can be determined based on this slot and the case of K0=0. By analogy, the PDCCH monitoring occasions in the slots corresponding respectively to cases of K1=2 and K1=3 can be obtained. These two PDCCH monitoring occasions coincide with two PDCCH monitoring occasions determined based on the case of N=2. Therefore, finally the PDCCH monitoring occasion set determined based on cases of N=2 and N=1 is 4 PDCCH monitoring occasions in slot n−4 to slot n−1. If multiple carriers are configured, the abovementioned determining method is used for each carrier, and then the union is taken to obtain the final PDCCH monitoring occasion set.

Furthermore, if the PDCCH monitoring occasion set corresponding to a carrier is determined only based on the case of N=2, the determined PDCCH monitoring occasion set of the carrier is as shown in FIG. 3; if the PDCCH monitoring occasion set corresponding to a carrier is determined only based on the case of N=1, the determined PDCCH monitoring occasion set of the carrier is as shown in FIG. 2.

Based upon the same application concept, embodiments of the present application provide a device for determining a dynamic HARQ-ACK codebook. Since the principle of this device to solve the problem is similar to that of this method, the implementations of this device can refer to the implementations of the method, and the repeated description thereof will be omitted here.

Figure 6:
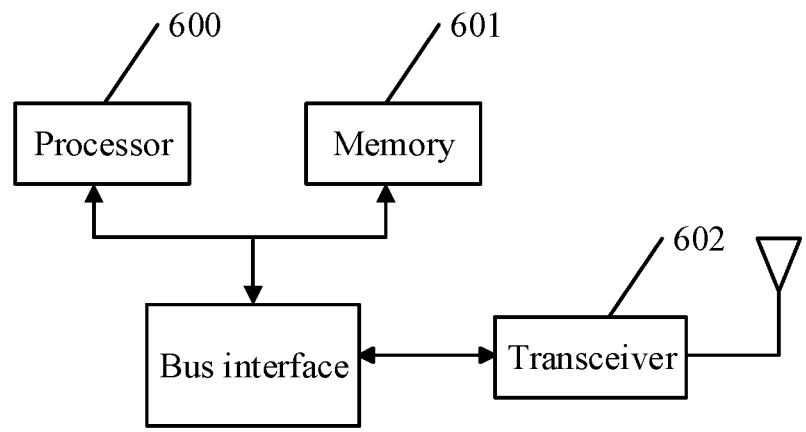
FIG. 6 is a structural schematic diagram of a first device for determining a dynamic HARQ-ACK codebook according to embodiments of the present application.

As shown in FIG. 6, a first device for determining a dynamic HARQ-ACK codebook in an embodiment of the present application includes a processor 600, a memory 601 and a transceiver 602.

The processor 600 is responsible for managing the bus architecture and general processing, and the memory 601 may store the data used by the processor 600 when performing the operations. The transceiver 602 is configured to receive and send the data under the control of the processor 600.

The bus architecture may include any numbers of interconnected buses and bridges, and specifically link various circuits of one or more processors represented by the processor 600 and the memory represented by the memory 601. The bus architecture may further link various other circuits such as peripheral device, voltage regulator and power management circuit, which are all well known in the art and thus will not be further described again herein. The bus interface provides an interface. The processor 600 is responsible for managing the bus architecture and general processing, and the memory 601 may store the data used by the processor 600 when performing the operations.

The procedure disclosed by the embodiments of the present application may be applied in the processor 600 or implemented by the processor 600. In the implementation process, each step of the signal processing flow may be completed by the integrated logic circuit of hardware in the processor 600 or the instruction in the form of software. The processor 600 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 601, and the processor 600 reads the information in the memory 601 and completes the steps of the signal processing flow in combination with its hardware.

In one embodiment, the processor 600 is configured to read the program in the memory 601 and perform:
  determining a PDCCH monitoring occasion set based on the configured number of PDSCH repetitions and/or on the PDCCH repetition number N=1; and the configured number of PDSCH repetitions is greater than 1;
  determining the dynamic HARQ-ACK codebook based on the PDCCH monitoring occasion set.

In one embodiment, the processor 600 configured to determine the PDCCH monitoring occasion set is configured to perform:
  determining the PDCCH monitoring occasion set based on the configured number of PDSCH repetitions and on the PDSCH repetition number N=1, when it is configured to monitor a PDCCH using Downlink Control Information, DCI, format 1-1;
  otherwise, determining the PDCCH monitoring occasion set based on the configured number of PDSCH repetitions.

In one embodiment, the processor 600 is configured to perform:
  for each carrier, when it is configured to monitor the PDCCH using DCI format 1-1,
    determining a PDCCH monitoring occasion set corresponding to the carrier based on the configured number of PDSCH repetitions and on the PDSCH repetition number N=1;

otherwise, determining the PDCCH monitoring occasion set corresponding to the carrier based on the configured number of PDSCH repetitions;

or for a group of carriers in case of carrier aggregation, when it is configured for at least one carrier in the group of carriers to monitor the PDCCH using DCI format 1-1, for each carrier in the group of carriers, determining a PDCCH monitoring occasion set corresponding to the each carrier in the group of carriers based on the configured number of PDSCH repetitions and on the PDSCH repetition number N=1;

otherwise, determining the PDCCH monitoring occasion set corresponding to the each carrier in the group of carriers based on the configured number of PDSCH repetitions.

In one embodiment, the processor 600 configured to determine the PDCCH monitoring occasion set is configured to perform:

determining the PDCCH monitoring occasion set based on the configured number of PDSCH repetitions and on the PDSCH repetition number N=1 when it is configured to monitor a PDCCH using DCI format 1-0;

otherwise, determining the PDCCH monitoring occasion set based on the configured number of PDSCH repetitions.

In one embodiment, the processor 600 is configured to perform:

for each carrier, when it is configured to monitor the PDCCH using DCI format 1-0, determining a PDCCH monitoring occasion set corresponding to the carrier based on the configured number of PDSCH repetitions and on the PDSCH repetition number N=1;

otherwise, determining the PDCCH monitoring occasion set corresponding to the carrier based on the configured number of PDSCH repetitions;

or for a group of carriers in case of carrier aggregation, when it is configured for at least one carrier in the group of carriers to monitor the PDCCH using DCI format 1-0, for each carrier in the group of carriers, determining a PDCCH monitoring occasion set corresponding to the each carrier in the group of carriers based on the configured number of PDSCH repetitions and on the PDSCH repetition number N=1;

otherwise, determining the PDCCH monitoring occasion set corresponding to the each carrier in the group of carriers based on the configured number of PDSCH repetitions.

In one embodiment, the processor 600 configured to determine the PDCCH monitoring occasion set is configured to perform:

determining the PDCCH monitoring occasion set based on the configured number of PDSCH repetitions and on the PDSCH repetition number N=1 when it is configured to monitor a PDCCH using DCI format 1-1 and a PDCCH using DCI format 1-0;

otherwise, determining the PDCCH monitoring occasion set based on the configured number of PDSCH repetitions.

In one embodiment, the processor 600 is configured to perform:

for each carrier, when it is configured to monitor the PDCCH using DCI format 1-1 and the PDCCH using DCI format 1-0, determining a PDCCH monitoring occasion set corresponding to the carrier based on the configured number of PDSCH repetitions and on the PDSCH repetition number N=1;

otherwise, determining the PDCCH monitoring occasion set corresponding to the carrier based on the configured number of PDSCH repetitions;

or for a group of carriers in case of carrier aggregation, when it is configured for at least one carrier in the group of carriers to monitor the PDCCH using DCI format 1-1 and for at least one carrier in the group of carriers to monitor the PDCCH using DCI format 1-0, for each carrier in the group of carriers, determining a PDCCH monitoring occasion set corresponding to the each carrier in the group of carriers based on the configured number of PDSCH repetitions and on the PDSCH repetition number N=1;

otherwise, determining the PDCCH monitoring occasion set corresponding to the each carrier in the group of carriers based on the configured number of PDSCH repetitions.

In one embodiment, the processor 600 configured to determine the PDCCH monitoring occasion set is configured to perform:

determining the PDCCH monitoring occasion set based on the PDSCH repetition number N=1 when it is configured to monitor only a PDCCH using DCI format 1-0;

otherwise, determining the PDCCH monitoring occasion set based on the configured number of PDSCH repetitions and on the PDSCH repetition number N=1.

In one embodiment, the processor 600 is configured to perform:

for each carrier, when it is configured to monitor only the PDCCH using DCI format 1-0, determining a PDCCH monitoring occasion set corresponding to the carrier based on the PDSCH repetition number N=1;

otherwise, determining the PDCCH monitoring occasion set corresponding to the carrier based on the configured number of PDSCH repetitions and on the PDSCH repetition number N=1;

or for a group of carriers in case of carrier aggregation, when it is configured for each carrier in the group of carriers to monitor only the PDCCH using DCI format 1-0, for each carrier in the group of carriers, determining a PDCCH monitoring occasion set corresponding to the each carrier in the group of carriers based on the PDSCH repetition number N=1;

otherwise, determining a PDCCH monitoring occasion set corresponding to the each carrier in the group of carriers based on the configured number of PDSCH repetitions and on the PDSCH repetition number N=1.

In one embodiment, the processor 600 configured to determine the PDCCH monitoring occasion set is configured to perform:

determining the PDCCH monitoring occasion set based on the configured number of PDSCH repetitions when it is configured to monitor only a PDCCH using DCI format 1-1;

otherwise, determining the PDCCH monitoring occasion set based on the configured number of PDSCH repetitions and on the PDSCH repetition number N=1.

In one embodiment, the processor 600 is configured to perform:

for each carrier, when it is configured to monitor only the PDCCH using DCI format 1-1,
determining a PDCCH monitoring occasion set corresponding to the carrier based on the configured number of PDSCH repetitions;
otherwise, determining the PDCCH monitoring occasion set corresponding to the carrier based on the configured number of PDSCH repetitions and on the PDSCH repetition number N=1;

or for a group of carriers in case of carrier aggregation, when it is configured for each carrier in the group of carriers to monitor only the PDCCH using DCI format 1-1, for each carrier in the group of carriers,
determining a PDCCH monitoring occasion set corresponding to the each carrier in the group of carriers based on the configured number of PDSCH repetitions;
otherwise, determining the PDCCH monitoring occasion set corresponding to the each carrier in the group of carriers based on the configured number of PDSCH repetitions and on the PDSCH repetition number N=1.

In one embodiment, the processor 600 configured to determine the PDCCH monitoring occasion set is configured to perform:

determining the PDCCH monitoring occasion set based on the PDSCH repetition number N=1 when it is configured to monitor only a PDCCH using DCI format 1-0;
determining the PDCCH monitoring occasion set based on the configured number of PDSCH repetitions when it is configured to monitor only a PDCCH using DCI format 1-1;
otherwise, determining the PDCCH monitoring occasion set based on the configured number of PDSCH repetitions and on the PDSCH repetition number N=1.

In one embodiment, the processor 600 is configured to perform:

for each carrier,
when it is configured to monitor only the PDCCH using DCI format 1-0, determining a PDCCH monitoring occasion set corresponding to the carrier based on the PDSCH repetition number N=1;
when it is configured to monitor only the PDCCH using DCI format 1-1, determining the PDCCH monitoring occasion set corresponding to the carrier based on the configured number of PDSCH repetitions;
otherwise, determining the PDCCH monitoring occasion set corresponding to the carrier based on the configured number of PDSCH repetitions and on the PDSCH repetition number N=1;

or for a group of carriers in case of carrier aggregation,
when it is configured for each carrier in the group of carriers to monitor only the PDCCH using DCI format 1-0, for each carrier in the group of carriers, determining a PDCCH monitoring occasion set corresponding to the each carrier in the group of carriers based on the PDSCH repetition number N=1;
when it is configured for each carrier in the group of carriers to monitor only the PDCCH using DCI format 1-1, for each carrier in the group of carriers, determining the PDCCH monitoring occasion set corresponding to the each carrier in the group of carriers based on the configured number of PDSCH repetitions;
otherwise, determining the PDCCH monitoring occasion set corresponding to the each carrier in the group of carriers based on the configured number of PDSCH repetitions and on the PDSCH repetition number N=1.

Figure 7:
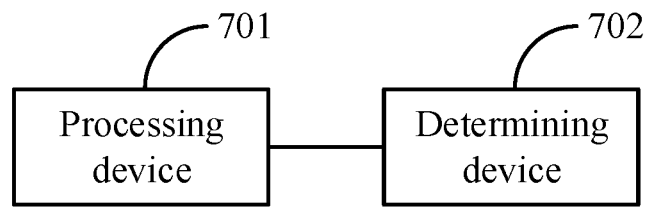
FIG. 7 is a structural schematic diagram of a second device for determining a dynamic HARQ-ACK codebook according to embodiments of the present application.

As shown in FIG. 7, a second device for determining a dynamic HARQ-ACK codebook in embodiments of the present application includes:

a processing device 701 configured to determine a PDCCH monitoring occasion set based on the configured number of PDSCH repetitions and/or on the PDSCH repetition number N=1; and the configured number of PDSCH repetitions is greater than 1;
a determining device 702 configured to determine the dynamic HARQ-ACK codebook based on the PDCCH monitoring occasion set.

In one embodiment, the processing device 701 configured to determine the PDCCH monitoring occasion set is configured to perform:

determining the PDCCH monitoring occasion set based on the configured number of PDSCH repetitions and on the PDSCH repetition number N=1, when it is configured to monitor a PDCCH using Downlink Control Information, DCI, format 1-1;
otherwise, determining the PDCCH monitoring occasion set based on the configured number of PDSCH repetitions.

In one embodiment, the processing device 701 is configured to perform:

for each carrier, when it is configured to monitor the PDCCH using DCI format 1-1,
determining a PDCCH monitoring occasion set corresponding to the carrier based on the configured number of PDSCH repetitions and on the PDSCH repetition number N=1;
otherwise, determining the PDCCH monitoring occasion set corresponding to the carrier based on the configured number of PDSCH repetitions;

or for a group of carriers in case of carrier aggregation, when it is configured for at least one carrier in the group of carriers to monitor the PDCCH using DCI format 1-1, for each carrier in the group of carriers,
determining a PDCCH monitoring occasion set corresponding to the each carrier in the group of carriers based on the configured number of PDSCH repetitions and on the PDSCH repetition number N=1;
otherwise, determining the PDCCH monitoring occasion set corresponding to the each carrier in the group of carriers based on the configured number of PDSCH repetitions.

In one embodiment, the processing device 701 configured to determine the PDCCH monitoring occasion set is configured to perform:

determining the PDCCH monitoring occasion set based on the configured number of PDSCH repetitions and on the PDSCH repetition number N=1 when it is configured to monitor a PDCCH using DCI format 1-0;
otherwise, determining the PDCCH monitoring occasion set based on the configured number of PDSCH repetitions.

In one embodiment, the processing device 701 is configured to perform:

for each carrier, when it is configured to monitor the PDCCH using DCI format 1-0, determining a PDCCH monitoring occasion set corresponding to the carrier based on the configured number of PDSCH repetitions and on the PDSCH repetition number N=1;

otherwise, determining the PDCCH monitoring occasion set corresponding to the carrier based on the configured number of PDSCH repetitions;

or for a group of carriers in case of carrier aggregation, when it is configured for at least one carrier in the group of carriers to monitor the PDCCH using DCI format 1-0, for each carrier in the group of carriers, determining a PDCCH monitoring occasion set corresponding to the each carrier in the group of carriers based on the configured number of PDSCH repetitions and on the PDSCH repetition number N=1;

otherwise, determining the PDCCH monitoring occasion set corresponding to the each carrier in the group of carriers based on the configured number of PDSCH repetitions.

In one embodiment, the processing device 701 configured to determine the PDCCH monitoring occasion set is configured to perform:

determining the PDCCH monitoring occasion set based on the configured number of PDSCH repetitions and on the PDSCH repetition number N=1 when it is configured to monitor a PDCCH using DCI format 1-1 and a PDCCH using DCI format 1-0;

otherwise, determining the PDCCH monitoring occasion set based on the configured number of PDSCH repetitions.

In one embodiment, the processing device 701 is configured to perform:

for each carrier, when it is configured to monitor the PDCCH using DCI format 1-1 and the PDCCH using DCI format 1-0, determining a PDCCH monitoring occasion set corresponding to the carrier based on the configured number of PDSCH repetitions and on the PDSCH repetition number N=1;

otherwise, determining the PDCCH monitoring occasion set corresponding to the carrier based on the configured number of PDSCH repetitions;

or for a group of carriers in case of carrier aggregation, when it is configured for at least one carrier in the group of carriers to monitor the PDCCH using DCI format 1-1 and for at least one carrier in the group of carriers to monitor the PDCCH using DCI format 1-0, for each carrier in the group of carriers, determining a PDCCH monitoring occasion set corresponding to the each carrier in the group of carriers based on the configured number of PDSCH repetitions and on the PDSCH repetition number N=1;

otherwise, determining the PDCCH monitoring occasion set corresponding to the each carrier in the group of carriers based on the configured number of PDSCH repetitions.

In one embodiment, the processing device 701 configured to determine the PDCCH monitoring occasion set is configured to perform:

determining the PDCCH monitoring occasion set based on the PDSCH repetition number N=1 when it is configured to monitor only a PDCCH using DCI format 1-0;

otherwise, determining the PDCCH monitoring occasion set based on the configured number of PDSCH repetitions and on the PDSCH repetition number N=1.

In one embodiment, the processing device 701 is configured to perform:

for each carrier, when it is configured to monitor only the PDCCH using DCI format 1-0, determining a PDCCH monitoring occasion set corresponding to the carrier based on the PDSCH repetition number N=1;

otherwise, determining the PDCCH monitoring occasion set corresponding to the carrier based on the configured number of PDSCH repetitions and on the PDSCH repetition number N=1;

or for a group of carriers in case of carrier aggregation, when it is configured for each carrier in the group of carriers to monitor only the PDCCH using DCI format 1-0, for each carrier in the group of carriers, determining a PDCCH monitoring occasion set corresponding to the each carrier in the group of carriers based on the PDSCH repetition number N=1;

otherwise, determining a PDCCH monitoring occasion set corresponding to the each carrier in the group of carriers based on the configured number of PDSCH repetitions and on the PDSCH repetition number N=1.

In one embodiment, the processing device 701 configured to determine the PDCCH monitoring occasion set is configured to perform:

determining the PDCCH monitoring occasion set based on the configured number of PDSCH repetitions when it is configured to monitor only a PDCCH using DCI format 1-1;

otherwise, determining the PDCCH monitoring occasion set based on the configured number of PDSCH repetitions and on the PDSCH repetition number N=1.

In one embodiment, the processing device 701 is configured to perform:

for each carrier, when it is configured to monitor only the PDCCH using DCI format 1-1, determining a PDCCH monitoring occasion set corresponding to the carrier based on the configured number of PDSCH repetitions;

otherwise, determining the PDCCH monitoring occasion set corresponding to the carrier based on the configured number of PDSCH repetitions and on the PDSCH repetition number N=1;

or for a group of carriers in case of carrier aggregation, when it is configured for each carrier in the group of carriers to monitor only the PDCCH using DCI format 1-1, for each carrier in the group of carriers, determining a PDCCH monitoring occasion set corresponding to the each carrier in the group of carriers based on the configured number of PDSCH repetitions;

otherwise, determining the PDCCH monitoring occasion set corresponding to the each carrier in the group of carriers based on the configured number of PDSCH repetitions and on the PDSCH repetition number N=1.

In one embodiment, the processing device 701 configured to determine the PDCCH monitoring occasion set is configured to perform:

determining the PDCCH monitoring occasion set based on the PDSCH repetition number N=1 when it is configured to monitor only a PDCCH using DCI format 1-0;

determining the PDCCH monitoring occasion set based on the configured number of PDSCH repetitions when it is configured to monitor only a PDCCH using DCI format 1-1;

otherwise, determining the PDCCH monitoring occasion set based on the configured number of PDSCH repetitions and on the PDSCH repetition number N=1.

In one embodiment, the processing device 701 is configured to perform:

for each carrier,
- when it is configured to monitor only the PDCCH using DCI format 1-0, determining a PDCCH monitoring occasion set corresponding to the carrier based on the PDSCH repetition number N=1;
- when it is configured to monitor only the PDCCH using DCI format 1-1, determining the PDCCH monitoring occasion set corresponding to the carrier based on the configured number of PDSCH repetitions;
- otherwise, determining the PDCCH monitoring occasion set corresponding to the carrier based on the configured number of PDSCH repetitions and on the PDSCH repetition number N=1;

or for a group of carriers in case of carrier aggregation,
- when it is configured for each carrier in the group of carriers to monitor only the PDCCH using DCI format 1-0, for each carrier in the group of carriers, determining a PDCCH monitoring occasion set corresponding to the each carrier in the group of carriers based on the PDSCH repetition number N=1;
- when it is configured for each carrier in the group of carriers to monitor only the PDCCH using DCI format 1-1, for each carrier in the group of carriers, determining the PDCCH monitoring occasion set corresponding to the each carrier in the group of carriers based on the configured number of PDSCH repetitions;
- otherwise, determining the PDCCH monitoring occasion set corresponding to the each carrier in the group of carriers based on the configured number of PDSCH repetitions and on the PDSCH repetition number N=1.

Embodiments of the present application further provide a computer storable medium storing a computer program thereon, where the program, when executed by a processor, implements the steps of the above method described on the terminal side.

Embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products based on the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

The invention claimed is:

1. A method for determining a dynamic Hybrid Automatic Repeat reQuest-Acknowledgement, HARQ-ACK, codebook, performed by a base station or a terminal, comprising:
    determining a Physical Downlink Control Channel, PDCCH, monitoring occasion set based on a configured number of Physical Downlink Shared Channel, PDSCH, repetitions and based on the PDSCH repetition number N=1; wherein the configured number of PDSCH repetitions is greater than 1;
    determining the dynamic HARQ-ACK codebook based on the PDCCH monitoring occasion set;
    wherein, determining the PDCCH monitoring occasion set comprises one of the following:
    method 1:
    when it is configured to monitor a PDCCH using Downlink Control Information, DCI, format 1-1, determining the PDCCH monitoring occasion set based on the configured number of PDSCH repetitions and the PDSCH repetition number N=1;
    otherwise, determining the PDCCH monitoring occasion set based on the configured number of PDSCH repetitions;
    method 2:
    when it is configured to monitor a PDCCH using DCI format 1-0, determining the PDCCH monitoring occasion set based on the configured number of PDSCH repetitions and on the PDSCH repetition number N=1;
    otherwise, determining the PDCCH monitoring occasion set based on the configured number of PDSCH repetitions;
    method 3:
    when it is configured to monitor a PDCCH using DCI format 1-1 and a PDCCH using DCI format 1-0, determining the PDCCH monitoring occasion set based on the configured number of PDSCH repetitions and on the PDSCH repetition number N=1;

otherwise, determining the PDCCH monitoring occasion set based on the configured number of PDSCH repetitions;

method 4:

when it is configured to monitor only a PDCCH using DCI format 1-0, determining the PDCCH monitoring occasion set based on the PDSCH repetition number N=1;

otherwise, determining the PDCCH monitoring occasion set based on the configured number of PDSCH repetitions and on the PDSCH repetition number N=1;

method 5;

when it is configured to monitor only a PDCCH using DCI format 1-1, determining the PDCCH monitoring occasion set based on the configured number of PDSCH repetitions;

otherwise, determining the PDCCH monitoring occasion set based on the configured number of PDSCH repetitions and on the PDSCH repetition number N=1;

method 6:

when it is configured to monitor only a PDCCH using DCI format 1-0, determining the PDCCH monitoring occasion set based on the PDSCH repetition number N=1;

when it is configured to monitor only a PDCCH using DCI format 1-1, determining the PDCCH monitoring occasion set based on the configured number of PDSCH repetitions;

otherwise, determining the PDCCH monitoring occasion set based on the configured number of PDSCH repetitions and on the PDSCH repetition number N=1.

2. The method of claim 1, wherein in the method 1:

for each carrier, when it is configured to monitor the PDCCH using DCI format 1-1, determining a PDCCH monitoring occasion set corresponding to the carrier based on the configured number of PDSCH repetitions and on the PDSCH repetition number N=1;

otherwise, determining the PDCCH monitoring occasion set corresponding to the carrier based on the configured number of PDSCH repetitions;

or for a group of carriers in case of carrier aggregation, when it is configured for at least one carrier in the group of carriers to monitor the PDCCH using DCI format 1-1, for each carrier in the group of carriers, determining a PDCCH monitoring occasion set corresponding to the each carrier in the group of carriers based on the configured number of PDSCH repetitions and on the PDSCH repetition number N=1;

otherwise, determining the PDCCH monitoring occasion set corresponding to the each carrier based on the configured number of PDSCH repetitions.

3. The method of claim 1, wherein in the method 2:

for each carrier, when it is configured to monitor the PDCCH using DCI format 1-0, determining a PDCCH monitoring occasion set corresponding to the carrier based on the configured number of PDSCH repetitions and on the PDSCH repetition number N=1;

otherwise, determining the PDCCH monitoring occasion set corresponding to the carrier based on the configured number of PDSCH repetitions;

or for a group of carriers in case of carrier aggregation, when it is configured for at least one carrier in the group of carriers to monitor the PDCCH using DCI format 1-0, for each carrier in the group of carriers, determining a PDCCH monitoring occasion set corresponding to the each carrier in the group of carriers based on the configured number of PDSCH repetitions and on the PDSCH repetition number N=1;

otherwise, determining the PDCCH monitoring occasion set corresponding to the each carrier based on the configured number of PDSCH repetitions.

4. The method of claim 1, wherein in the method 3:

for each carrier, when it is configured to monitor the PDCCH using DCI format 1-1 and the PDCCH using DCI format 1-0, determining a PDCCH monitoring occasion set corresponding to the carrier based on the configured number of PDSCH repetitions and on the PDSCH repetition number N=1;

otherwise, determining the PDCCH monitoring occasion set corresponding to the carrier based on the configured number of PDSCH repetitions;

or for a group of carriers in case of carrier aggregation, when it is configured for at least one carrier in the group of carriers to monitor the PDCCH using DCI format 1-1 and for at least one carrier in the group of carriers to monitor the PDCCH using DCI format 1-0, for each carrier in the group of carriers, determining a PDCCH monitoring occasion set corresponding to the each carrier in the group of carriers based on the configured number of PDSCH repetitions and on the PDSCH repetition number N=1;

otherwise, determining the PDCCH monitoring occasion set corresponding to the each carrier based on the configured number of PDSCH repetitions.

5. The method of claim 1, wherein in the method 4:

for each carrier, when it is configured to monitor only the PDCCH using DCI format 1-0, determining a PDCCH monitoring occasion set corresponding to the carrier based on the PDSCH repetition number N=1;

otherwise, determining the PDCCH monitoring occasion set corresponding to the carrier based on the configured number of PDSCH repetitions and on the PDSCH repetition number N=1;

or for a group of carriers in case of carrier aggregation, when it is configured for each carrier in the group of carriers to monitor only the PDCCH using DCI format 1-0, for each carrier in the group of carriers, determining a PDCCH monitoring occasion set corresponding to the each carrier in the group of carriers based on the PDSCH repetition number N=1;

otherwise, determining a PDCCH monitoring occasion set corresponding to the each carrier based on the configured number of PDSCH repetitions and on the PDSCH repetition number N=1.

6. The method of claim 1, wherein in the method 5:

for each carrier, when it is configured to monitor only the PDCCH using DCI format 1-1, determining a PDCCH monitoring occasion set corresponding to the carrier based on the configured number of PDSCH repetitions;

otherwise, determining the PDCCH monitoring occasion set corresponding to the carrier based on the configured number of PDSCH repetitions and on the PDSCH repetition number N=1;

or for a group of carriers in case of carrier aggregation, when it is configured for each carrier in the group of carriers to monitor only the PDCCH using DCI format 1-1, for each carrier in the group of carriers, determining a PDCCH monitoring occasion set corresponding to the each carrier in the group of carriers based on the configured number of PDSCH repetitions;

otherwise, determining the PDCCH monitoring occasion set corresponding to the carrier based on the configured number of PDSCH repetitions and on the PDSCH repetition number N=1.

7. The method of claim 1, wherein in the method 6:

for each carrier, when it is configured to monitor only the PDCCH using DCI format 1-0, determining a PDCCH monitoring occasion set corresponding to the carrier based on the PDSCH repetition number N=1;

when it is configured to monitor only the PDCCH using DCI format 1-1, determining the PDCCH monitoring occasion set corresponding to the carrier based on the configured number of PDSCH repetitions;

otherwise, determining the PDCCH monitoring occasion set corresponding to the carrier based on the configured number of PDSCH repetitions and on the PDSCH repetition number N=1;

or for a group of carriers in case of carrier aggregation, when it is configured for each carrier in the group of carriers to monitor only the PDCCH using DCI format 1-0, for each carrier in the group of carriers, determining a PDCCH monitoring occasion set corresponding to the each carrier in the group of carriers based on the PDSCH repetition number N=1;

when it is configured for each carrier in the group of carriers to monitor only the PDCCH using DCI format 1-1, for each carrier in the group of carriers, determining the PDCCH monitoring occasion set corresponding to the each carrier in the group of carriers based on the configured number of PDSCH repetitions;

otherwise, determining the PDCCH monitoring occasion set corresponding to each carrier in the group of carriers based on the configured number of PDSCH repetitions and on the PDSCH repetition number N=1.

8. A device for determining a dynamic Hybrid Automatic Repeat reQuest-Acknowledgement, HARQ-ACK codebook, comprising: a processor, a memory and a transceiver;

wherein the processor is configured to read a program in the memory and perform:

determining a Physical Downlink Control Channel, PDCCH, monitoring occasion set based on a configured number of Physical Downlink Shared Channel, PDSCH, repetitions and based on the PDSCH repetition number N=1; wherein the configured number of PDSCH repetitions is greater than 1;

determining the dynamic HARQ-ACK codebook based on the PDCCH monitoring occasion set;

wherein, the processor configured to determine the PDCCH monitoring occasion set by one of following methods:

method 1:

when it is configured to monitor a PDCCH using Downlink Control Information, DCI, format 1-1, determining the PDCCH monitoring occasion set based on the configured number of PDSCH repetitions and on the PDSCH repetition number N=1;

otherwise, determining the PDCCH monitoring occasion set based on the configured number of PDSCH repetitions;

method 2:

when it is configured to monitor a PDCCH using DCI format 1-0, determining the PDCCH monitoring occasion set based on the configured number of PDSCH repetitions and on the PDSCH repetition number N=1;

otherwise, determining the PDCCH monitoring occasion set based on the configured number of PDSCH repetitions;

method 3:

when it is configured to monitor a PDCCH using DCI format 1-1 and a PDCCH using DCI format 1-0, determining the PDCCH monitoring occasion set based on the configured number of PDSCH repetitions and on the PDSCH repetition number N=1;

otherwise, determining the PDCCH monitoring occasion set based on the configured number of PDSCH repetitions;

method 4:

when it is configured to monitor only a PDCCH using DCI format 1-0, determining the PDCCH monitoring occasion set based on the PDSCH repetition number N=1;

otherwise, determining the PDCCH monitoring occasion set based on the configured number of PDSCH repetitions and on the PDSCH repetition number N=1;

method 5;

when it is configured to monitor only a PDCCH using DCI format 1-1, determining the PDCCH monitoring occasion set based on the configured number of PDSCH repetitions;

otherwise, determining the PDCCH monitoring occasion set based on the configured number of PDSCH repetitions and on the PDSCH repetition number N=1;

method 6:

when it is configured to monitor only a PDCCH using DCI format 1-0, determining the PDCCH monitoring occasion set based on the PDSCH repetition number N=1:

when it is configured to monitor only a PDCCH using DCI format 1-1, determining the PDCCH monitoring occasion set based on the configured number of PDSCH repetitions;

otherwise, determining the PDCCH monitoring occasion set based on the configured number of PDSCH repetitions and on the PDSCH repetition number N=1.

9. The device of claim 8, wherein, in the method 1:

for each carrier, when it is configured to monitor the PDCCH using DCI format 1-1, determining a PDCCH monitoring occasion set corresponding to the carrier based on the configured number of PDSCH repetitions and on the PDSCH repetition number N=1;

otherwise, determining the PDCCH monitoring occasion set corresponding to the carrier based on the configured number of PDSCH repetitions;

or for a group of carriers in case of carrier aggregation, when it is configured for at least one carrier in the group of carriers to monitor the PDCCH using DCI format 1-1, for each carrier in the group of carriers, determining a PDCCH monitoring occasion set corresponding to the each carrier in the group of carriers based on the configured number of PDSCH repetitions and on the PDSCH repetition number N=1;

otherwise, determining the PDCCH monitoring occasion set corresponding to the each carrier in the group of carriers based on the configured number of PDSCH repetitions.

10. The device of claim 8, wherein, in the method 2:
for each carrier, when it is configured to monitor the PDCCH using DCI format 1-0,
determining a PDCCH monitoring occasion set corresponding to the carrier based on the configured number of PDSCH repetitions and on the PDSCH repetition number N=1;
otherwise, determining the PDCCH monitoring occasion set corresponding to the carrier based on the configured number of PDSCH repetitions;
or
for a group of carriers in case of carrier aggregation, when it is configured for at least one carrier in the group of carriers to monitor the PDCCH using DCI format 1-0, for each carrier in the group of carriers,
determining a PDCCH monitoring occasion set corresponding to the each carrier in the group of carriers based on the configured number of PDSCH repetitions and on the PDSCH repetition number N=1;
otherwise, determining the PDCCH monitoring occasion set corresponding to the each carrier in the group of carriers based on the configured number of PDSCH repetitions.

11. The device of claim 8, wherein, in the method 3:
for each carrier, when it is configured to monitor the PDCCH using DCI format 1-1 and the PDCCH using DCI format 1-0,
determining a PDCCH monitoring occasion set corresponding to the carrier based on the configured number of PDSCH repetitions and on the PDSCH repetition number N=1;
otherwise, determining the PDCCH monitoring occasion set corresponding to the carrier based on the configured number of PDSCH repetitions;
or
for a group of carriers in case of carrier aggregation, when it is configured for at least one carrier in the group of carriers to monitor the PDCCH using DCI format 1-1 and for at least one carrier in the group of carriers to monitor the PDCCH using DCI format 1-0, for each carrier in the group of carriers,
determining a PDCCH monitoring occasion set corresponding to the each carrier in the group of carriers based on the configured number of PDSCH repetitions and on the PDSCH repetition number N=1;
otherwise, determining the PDCCH monitoring occasion set corresponding to the each carrier in the group of carriers based on the configured number of PDSCH repetitions.

12. The device of claim 8, wherein, in the method 4:
for each carrier, when it is configured to monitor only the PDCCH using DCI format 1-0,
determining a PDCCH monitoring occasion set corresponding to the carrier based on the PDSCH repetition number N=1;
otherwise, determining the PDCCH monitoring occasion set corresponding to the carrier based on the configured number of PDSCH repetitions and on the PDSCH repetition number N=1;
or
for a group of carriers in case of carrier aggregation, when it is configured for each carrier in the group of carriers to monitor only the PDCCH using DCI format 1-0, for each carrier in the group of carriers,
determining a PDCCH monitoring occasion set corresponding to the each carrier in the group of carriers based on the PDSCH repetition number N=1;
otherwise, determining a PDCCH monitoring occasion set corresponding to the each carrier in the group of carriers based on the configured number of PDSCH repetitions and on the PDSCH repetition number N=1.

13. The device of claim 8, wherein, in the method 5:
for each carrier, when it is configured to monitor only the PDCCH using DCI format 1-1,
determining a PDCCH monitoring occasion set corresponding to the carrier based on the configured number of PDSCH repetitions;
otherwise, determining the PDCCH monitoring occasion set corresponding to the carrier based on the configured number of PDSCH repetitions and on the PDSCH repetition number N=1;
or
for a group of carriers in case of carrier aggregation, when it is configured for each carrier in the group of carriers to monitor only the PDCCH using DCI format 1-1, for each carrier in the group of carriers,
determining a PDCCH monitoring occasion set corresponding to the each carrier in the group of carriers based on the configured number of PDSCH repetitions;
otherwise, determining the PDCCH monitoring occasion set corresponding to the each carrier in the group of carriers based on the configured number of PDSCH repetitions and on the PDSCH repetition number N=1.

14. The device of claim 8, wherein, in the method 6:
for each carrier,
when it is configured to monitor only the PDCCH using DCI format 1-0, determining a PDCCH monitoring occasion set corresponding to the carrier based on the PDSCH repetition number N=1;
when it is configured to monitor only the PDCCH using DCI format 1-1, determining the PDCCH monitoring occasion set corresponding to the carrier based on the configured number of PDSCH repetitions;
otherwise, determining the PDCCH monitoring occasion set corresponding to the carrier based on the configured number of PDSCH repetitions and on the PDSCH repetition number N=1;
or
for a group of carriers in case of carrier aggregation,
when it is configured for each carrier in the group of carriers to monitor only the PDCCH using DCI format 1-0, for each carrier in the group of carriers, determining a PDCCH monitoring occasion set corresponding to the each carrier in the group of carriers based on the PDSCH repetition number N=1;
when it is configured for each carrier in the group of carriers to monitor only the PDCCH using DCI format 1-1, for each carrier in the group of carriers, determining the PDCCH monitoring occasion set corresponding to the each carrier in the group of carriers based on the configured number of PDSCH repetitions;
otherwise, determining the PDCCH monitoring occasion set corresponding to the each carrier in the group of carriers based on the configured number of PDSCH repetitions and on the PDSCH repetition number N=1.

15. A non-transitory computer storable medium storing a computer program thereon, wherein, the computer program, when executed by a processor, implements steps of a method for determining a dynamic Hybrid Automatic Repeat reQuest-Acknowledgement, HARQ-ACK, codebook, wherein the method comprises:

determining a Physical Downlink Control Channel, PDCCH, monitoring occasion set based on a configured number of Physical Downlink Shared Channel, PDSCH, repetitions and based on the PDSCH repetition number N=1; wherein the configured number of PDSCH repetitions is greater than 1;

determining the dynamic HARQ-ACK codebook based on the PDCCH monitoring occasion set;

wherein, determining the PDCCH monitoring occasion set comprises one of the following:

method 1:
when it is configured to monitor a PDCCH using Downlink Control Information, DCI, format 1-1, determining the PDCCH monitoring occasion set based on the configured number of PDSCH repetitions and the PDSCH repetition number N=1;
otherwise, determining the PDCCH monitoring occasion set based on the configured number of PDSCH repetitions;

method 2:
when it is configured to monitor a PDCCH using DCI format 1-0, determining the PDCCH monitoring occasion set based on the configured number of PDSCH repetitions and on the PDSCH repetition number N=1;
otherwise, determining the PDCCH monitoring occasion set based on the configured number of PDSCH repetitions;

method 3:
when it is configured to monitor a PDCCH using DCI format 1-1 and a PDCCH using DCI format 1-0, determining the PDCCH monitoring occasion set based on the configured number of PDSCH repetitions and on the PDSCH repetition number N=1;
otherwise, determining the PDCCH monitoring occasion set based on the configured number of PDSCH repetitions;

method 4:
when it is configured to monitor only a PDCCH using DCI format 1-0, determining the PDCCH monitoring occasion set based on the PDSCH repetition number N=1;
otherwise, determining the PDCCH monitoring occasion set based on the configured number of PDSCH repetitions and on the PDSCH repetition number N=1;

method 5:
when it is configured to monitor only a PDCCH using DCI format 1-1, determining the PDCCH monitoring occasion set based on the configured number of PDSCH repetitions;
otherwise, determining the PDCCH monitoring occasion set based on the configured number of PDSCH repetitions and on the PDSCH repetition number N=1;

method 6:
when it is configured to monitor only a PDCCH using DCI format 1-0, determining the PDCCH monitoring occasion set based on the PDSCH repetition number N=1;
when it is configured to monitor only a PDCCH using DCI format 1-1, determining the PDCCH monitoring occasion set based on the configured number of PDSCH repetitions;
otherwise, determining the PDCCH monitoring occasion set based on the configured number of PDSCH repetitions and on the PDSCH repetition number N=1.

* * * * *